US012601906B2

(12) United States Patent
Gamet et al.

(10) Patent No.: US 12,601,906 B2
(45) Date of Patent: Apr. 14, 2026

(54) SCANNING MIRROR SYSTEMS AND METHODS OF MANUFACTURE

(71) Applicant: Magic Leap, Inc., Plantation, FL (US)

(72) Inventors: Julien Gamet, Saint Point Lac (FR); Stephan Arthur Gamper, Lausanne (CH)

(73) Assignee: Magic Leap, Inc., Plantation, FL (US)

( * ) Notice: Subject to any disclaimer, the term of this patent is extended or adjusted under 35 U.S.C. 154(b) by 176 days.

(21) Appl. No.: 18/370,009

(22) Filed: Sep. 19, 2023

(65) Prior Publication Data

US 2024/0012237 A1        Jan. 11, 2024

Related U.S. Application Data

(63) Continuation of application No. 17/150,694, filed on Jan. 15, 2021, now Pat. No. 11,796,791.

(60) Provisional application No. 63/058,384, filed on Jul. 29, 2020, provisional application No. 62/962,168, filed on Jan. 16, 2020.

(51) Int. Cl.
*G02B 26/08* (2006.01)
*G02B 26/10* (2006.01)

(52) U.S. Cl.
CPC ....... *G02B 26/101* (2013.01); *G02B 26/0858* (2013.01)

(58) Field of Classification Search
CPC .............. G02B 26/101; G02B 26/0858; G02B 27/0172; G02B 26/085
See application file for complete search history.

(56) References Cited

U.S. PATENT DOCUMENTS

| | | | |
|---|---|---|---|
| 2,771,813 A | 11/1956 | Mihalyi |
| 3,748,015 A | 7/1973 | Offner |
| 6,392,811 B1 | 5/2002 | Lindau |
| 6,856,446 B2 | 2/2005 | DiCarlo |
| 6,989,921 B2 | 1/2006 | Bernstein et al. |
| 7,071,594 B1 | 7/2006 | Yan et al. |
| 8,531,750 B2 | 9/2013 | Kessler |
| 8,817,379 B2 | 8/2014 | Saeedi et al. |

(Continued)

FOREIGN PATENT DOCUMENTS

| | | |
|---|---|---|
| CN | 1479879 A | 3/2004 |
| CN | 1750581 A | 3/2006 |

(Continued)

OTHER PUBLICATIONS

U.S. Appl. No. 17/154,965, "Notice of Allowance", Jan. 10, 2024, 7 pages.

(Continued)

*Primary Examiner* — Euncha P Cherry
(74) *Attorney, Agent, or Firm* — KILPATRICK TOWNSEND & STOCKTON LLP

(57) ABSTRACT

A scanning micromirror system includes a base having an axis passing therethrough, a plurality of support flexures coupled to the base, and a platform coupled to the base by the plurality of support flexures. The platform has a first side and a second side opposing the first side and is operable to oscillate about the axis. The scanning micromirror system also includes a stress relief layer positioned on the first side of the platform and a reflector positioned on the first side of the platform. The stress relief layer is positioned between the reflector and the platform.

19 Claims, 18 Drawing Sheets

(56) References Cited

U.S. PATENT DOCUMENTS

| | | | | |
|---|---|---|---|---|
| 9,063,549 | B1 | 6/2015 | Pennecot | |
| 9,740,003 | B2 | 8/2017 | Potsaid et al. | |
| 11,796,791 | B2 * | 10/2023 | Gamet | G02B 26/0858 |
| 12,061,333 | B2 | 8/2024 | Gamet | |
| 12,099,173 | B2 | 9/2024 | Stanley et al. | |
| 2002/0050744 | A1 | 5/2002 | Bernstein et al. | |
| 2003/0132522 | A1 * | 7/2003 | Alie | B81B 7/0006 |
| | | | | 257/758 |
| 2005/0253055 | A1 | 11/2005 | Sprague et al. | |
| 2007/0047105 | A1 | 3/2007 | Lerner et al. | |
| 2007/0195439 | A1 | 8/2007 | Denatale et al. | |
| 2007/0216982 | A1 | 9/2007 | Sanders et al. | |
| 2007/0273794 | A1 | 11/2007 | Sprague et al. | |
| 2008/0078363 | A1 * | 4/2008 | Apperson | F02B 21/00 |
| | | | | 123/557 |
| 2009/0027748 | A1 | 1/2009 | Sprague et al. | |
| 2009/0067033 | A1 * | 3/2009 | Kajino | G02B 26/0841 |
| 2009/0284816 | A1 | 11/2009 | Davis et al. | |
| 2010/0208319 | A1 | 8/2010 | Kessler | |
| 2011/0025930 | A1 | 2/2011 | Sprague et al. | |
| 2011/0122101 | A1 | 5/2011 | Kurozuka | |
| 2012/0307328 | A1 | 12/2012 | Kessler | |
| 2014/0268268 | A1 | 9/2014 | Kin et al. | |
| 2016/0187643 | A1 | 6/2016 | Booth et al. | |
| 2017/0102538 | A1 * | 4/2017 | Gamet | G02B 26/101 |
| 2017/0297898 | A1 * | 10/2017 | Torkkeli | G02B 26/0833 |
| 2018/0176524 | A1 | 6/2018 | Kobori et al. | |
| 2018/0299666 | A1 | 10/2018 | Nestorovic et al. | |
| 2019/0278076 | A1 | 9/2019 | Chen et al. | |
| 2019/0331774 | A1 | 10/2019 | Jackson | |
| 2021/0191106 | A1 | 6/2021 | Sugimoto et al. | |
| 2021/0223541 | A1 | 7/2021 | Gamet et al. | |
| 2021/0227187 | A1 | 7/2021 | Stanley et al. | |
| 2021/0231963 | A1 | 7/2021 | Janes et al. | |
| 2021/0382299 | A1 | 12/2021 | Gamet | |

FOREIGN PATENT DOCUMENTS

| | | | |
|---|---|---|---|
| CN | 103686027 A | 3/2014 | |
| CN | 104246617 A | 12/2014 | |
| CN | 104297918 A | 1/2015 | |
| CN | 110806639 A | 2/2020 | |
| JP | 2003315726 A | 11/2003 | |
| JP | 2007065649 A | 3/2007 | |
| JP | 2007178942 A | 7/2007 | |
| JP | 2007312592 A | 11/2007 | |
| JP | 2008514977 A | 5/2008 | |
| JP | 2009093105 A | 4/2009 | |
| JP | 2009533715 A | 9/2009 | |
| JP | 2009251143 A | 10/2009 | |
| JP | 2014119616 A | 6/2014 | |
| JP | 2018060029 A | 4/2018 | |
| WO | 8203924 A1 | 11/1982 | |
| WO | 2013110665 A1 | 8/2013 | |
| WO | 2021146583 A1 | 7/2021 | |
| WO | 2021150781 A1 | 7/2021 | |

OTHER PUBLICATIONS

EP24208450.7, "Extended European Search Report", Mar. 12, 2025, 7 pages.

JP2022-542944 ., "Notice of Allowance", Mar. 11, 2025, 3 pages. [no translation available].

JP2022-542945 ., "Office Action and English translation", Jan. 28, 2025, 11 pages.

U.S. Appl. No. 17/150,694, "Notice of Allowance", Jun. 20, 2023, 8 pages.

U.S. Appl. No. 17/154,965, "Final Office Action", Oct. 17, 2023, 12 pages.

U.S. Appl. No. 17/154,965, "Non-Final Office Action", Apr. 17, 2023, 11 pages.

EP21741743.5, "Extended European Search Report", Jun. 27, 2023, 5 pages.

PCT/US2021/013676, "International Preliminary Report on Patentability", Jul. 28, 2022, 11 pages.

PCT/US2021/013676, "International Search Report and Written Opinion", Apr. 8, 2021, 14 pages.

PCT/US2021/014455, "International Preliminary Report on Patentability", Aug. 4, 2022, 10 pages.

PCT/US2021/014455, "International Search Report and Written Opinion", Apr. 9, 2021, 11 pages.

U.S. Appl. No. 17/154,965, "Notice of Allowance", Apr. 19, 2024, 8 pages.

U.S. Appl. No. 17/338,402, "Notice of Allowance", Apr. 16, 2024, 9 pages.

JP2022-542944, "Office Action" and English translation, Oct. 22, 2024, 9 pages.

EP21744097.3, "Extended European Search Report", Jan. 5, 2024, 14 pages.

U.S. Appl. No. 18/774,790, "Non-Final Office Action", Jul. 7, 2025, 11 pages.

CN202180009398.3, "Office Action and English translation", Jan. 22, 2026, 18 pages.

CN202180010024.3, "Office Action and English translation", Jan. 20, 2026, 24 pages.

Jp2022-542945, "Notice of Allowance and English translation", Nov. 25, 2025, 6 pages.

* cited by examiner

200

260

265

250

400

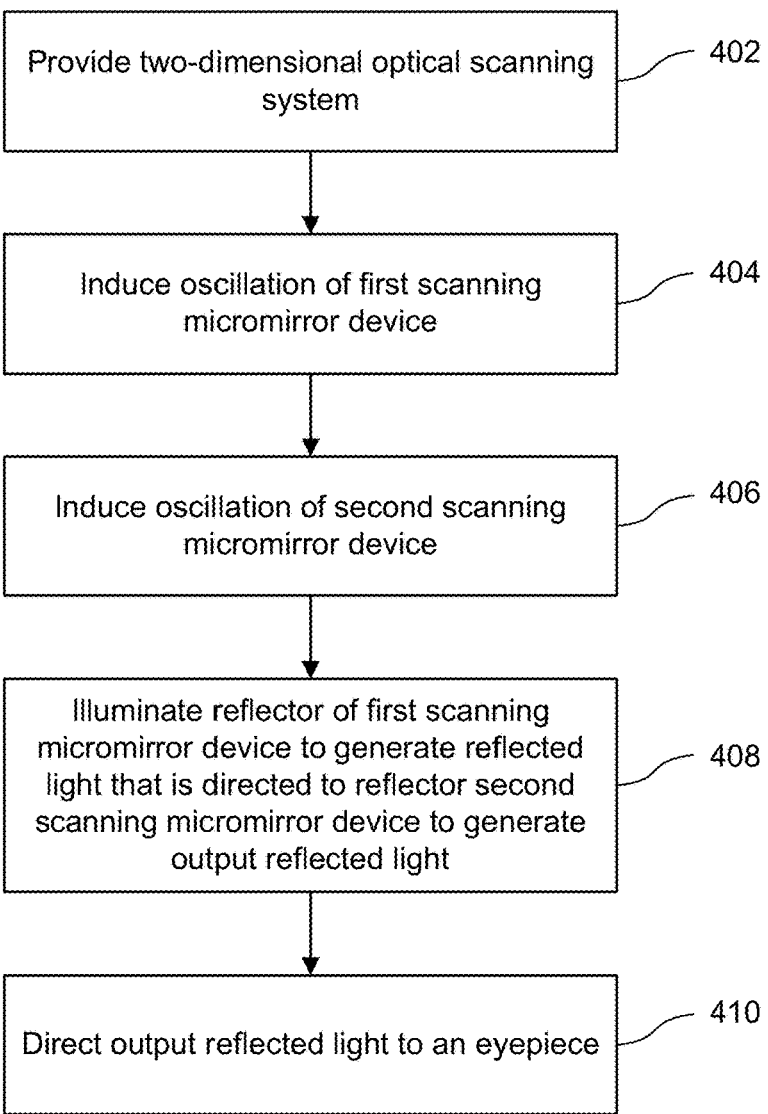

Provide two-dimensional optical scanning system — 402

Induce oscillation of first scanning micromirror device — 404

Induce oscillation of second scanning micromirror device — 406

Illuminate reflector of first scanning micromirror device to generate reflected light that is directed to reflector second scanning micromirror device to generate output reflected light — 408

Direct output reflected light to an eyepiece — 410

SCANNING MIRROR SYSTEMS AND METHODS OF MANUFACTURE

CROSS-REFERENCE TO RELATED APPLICATIONS

This application is a continuation of U.S. patent application Ser. No. 17/150,694, filed Jan. 15, 2021, U.S. Pat. No. 11,796,791, issued Oct. 24, 2023, entitled "SCANNING MIRROR SYSTEMS AND METHODS OF MANUFAC-TURE," which is a non-provisional of and claims the benefit of and priority to U.S. Provisional Application No. 62/962,168, filed on Jan. 16, 2020, and U.S. Provisional Application No. 63/058,384, filed on Jul. 29, 2020, the contents of which are hereby incorporated by reference in their entireties.

BACKGROUND

Digital micromirror devices have been used in image projection systems. For example, U.S. Pat. No. 6,856,446 describes a micromirror array in which many individually hinged and controllable micromirror elements can be used to control the direction of reflected light to project an array of digital pixels. These devices often require use of a color wheel or three individual pixel arrays for different colors to project a full color image, and generally use large and high intensity light sources, limiting the compactness of the projection systems.

SUMMARY

The present disclosure relates to two-dimensional scanning micromirror systems and their use in image projection systems and methods. The disclosed two-dimensional scanning micromirror systems are advantageously useful for driving reflected light in two directions, and can be considerably more robust and compact than other reflective scanning systems. The disclosed two-dimensional scanning micromirror systems can make use of two separate uniaxial micromirror devices for scanning a beam of light in orthogonal directions.

In a first aspect, optical scanning systems are disclosed. The optical scanning systems may comprise one or more scanning micromirror devices, useful for projecting and scanning a beam of light. In some cases, two scanning micromirror devices may be used in sequence, a first scanning micromirror device for scanning along a first direction, and a second scanning micromirror device, in optical communication with the first scanning micromirror device, for scanning along a second direction. Optionally, a hermetic packaging can enclose a scanning micromirror device for maintaining a lower pressure at the scanning micromirror device inside the hermetic packaging than outside the hermetic packaging. In some embodiments, an optical relay may be used for providing optical communication between the first scanning micromirror device and the second scanning micromirror device. Example optical relays include, but are not limited to, those described by U.S. Provisional Application No. 62/964,508, filed on Jan. 22, 2020, hereby incorporated by reference. An optical scanning system may include a light source arranged to direct emitted light to the first reflector of the first scanning micromirror device. The light source can be modulatable to allow for control over color and/or intensity as a function of time and/or the projected position of the light reflected from the scanning micromirror devices to allow for image display.

An example scanning micromirror device comprises a first platform coupled to a first base by a plurality of first support flexures, such as where the first platform is oscillatable about a first axis; a stress relief layer positioned on a first side of the first platform; a first reflector positioned on the first side of the first platform, such as with the stress relief layer positioned between the first reflector and the first platform; a first conducting coil positioned on a second side of the first platform opposite to the first side of the first platform, the first conducting coil arranged to apply magnetic forces to the first platform about the first axis; and a first magnetic field source arranged to apply a first magnetic field to the first platform. Useful scanning micromirror devices include, but are not limited to, those having a natural resonant frequency of 1 kHz to 10 MHz.

Scanning micromirror devices of this aspect may use thick platforms, in some cases. A thick platform may allow for the reflector of the micromirror device to be robust and have a good flatness despite inclusion of other components in the platform. In some examples, the first platform may have a thickness of from 100 μm to 500 μm. Use of a stress relief layer may also enhance the flatness of the reflector, by allowing stresses on different sides of the platform to offset one another, resulting in a good flatness of the reflector. In some examples, the stress relief layer provides a first stress distribution on the first side of the first platform while the first conducting coil provides a second stress distribution on the second side of the first platform. As such, the first stress distribution and the second stress distribution may oppose one another and result in at least partially offsetting one another. In some cases, the first conducting coil may be embedded into the second side of the first platform (e.g., positioned in a trench or trenches on the first platform), or it may be position over and supported by the second side of the first platform (e.g., as a partial overlayer).

The scanning micromirror devices may be actuated using electromagnetic actuation, such as where a current passing through a conducting coil interacts with a magnetic field and where the current is oscillatory in nature to drive oscillatory forces and/or oscillations of the platform. For example, the first magnetic field source may be arranged to provide the first magnetic field oriented orthogonal to the first axis. Scanning micromirror devices may further comprise a plurality of conductive traces on the plurality of support flexures, such as for providing electrical communication with a conducting coil. In some cases, the conductive traces may apply strain on the support flexures, so it may be desirable for the of conductive traces to be arranged on the plurality of support flexures in a configuration to apply opposite stresses on different sides of the plurality of first support flexures, which may be useful for avoiding, reducing, or limiting nonlinear effects.

In some cases, additional components may be included in the scanning micromirror devices, such as actuation components or sensor components. In one example, a scanning micromirror device may further comprise one or more piezoelectric actuators arranged to apply forces to oscillate the first platform about the first axis or to sense oscillation or position of the first platform about the first axis.

Another example scanning micromirror device comprises a first frame coupled to a second base by a plurality of second support flexures, such as where the first frame is oscillatable about a second axis; a second platform coupled to the first frame, such as where the second platform is oscillatable about the second axis together with the first frame; a second reflector positioned on the second platform; a second conducting coil positioned on the first frame, the second conducting coil arranged to apply magnetic forces to the first frame about the second axis; and a second magnetic field source arranged to apply a second magnetic field to the first frame. Useful scanning micromirror devices include, but are not limited to, those having a natural resonant frequency of 15 Hz to about 2 kHz.

In some examples, a scanning micromirror device may further comprise a second frame coupled between the first frame and the second platform, such as where the second frame is coupled to the first frame by a plurality of third support flexures and where the second frame is oscillatable about the second axis together with the first frame and the second platform. In some examples, such an intermediate frame can include other components, such as sensors or actuators. For example, in some embodiments, a scanning micromirror device may further comprise a temperature sensor incorporated in the second frame. Optionally, a second scanning micromirror device may further comprise a strain sensor incorporated in the second frame. Optionally, a scanning micromirror device may further comprise a plurality of piezoelectric actuators incorporated in the second frame, such as piezoelectric actuators that are arranged to alter or sense a position of the second platform about a third axis orthogonal to the second axis or to alter or sense a curvature of the second platform.

Methods of projecting images are also described herein. An example method comprises providing a two-dimensional optical scanning system, such as a two-dimensional optical scanning system comprising a first scanning micromirror device and a second scanning micromirror device in optical communication with the first scanning micromirror device; inducing a first oscillation of the first scanning micromirror device at a first frequency; inducing a second oscillation of the second scanning micromirror device at a second frequency, such as where the second frequency is optionally smaller than the first frequency; and illuminating a first reflector of the first scanning micromirror device with a light source to generate reflected light that is directed to the second scanning micromirror device and reflected by a second reflector of the second scanning micromirror device to generate output reflected light. The first and second scanning micromirror devices may independently correspond to different scanning micromirror devices described herein. Optionally, methods of this aspect may further comprise directing the output reflected light from the second scanning micromirror device to an eyepiece. Methods of this aspect may further comprise synchronously controlling oscillation of the first scanning micromirror device, oscillation of the second scanning micromirror device, and output color and/or intensity of light from the light source. Such a configuration may be useful for drawing an image or image field as well as a sequence of images or image fields.

The disclosed scanning micromirror devices and projection methods may be advantageously employed in head mounted display systems. An example head-mounted display system may comprise a two-dimensional optical scanning system; and an eyepiece comprising one or more optical components configured to receive and redirect light reflected or output from the two-dimensional optical scanning system to one or two eyes of a user. A head mounted display system may include control circuitry operatively coupled to a light source and scanning micromirror device(s) of the two-dimensional optical scanning system, to allow for display of images. For example, the control circuitry may be configured to display one or more images by synchronously: controlling the light source to emit light corresponding to pixels of the one or more images; controlling current flow in a first conducting coil of a first scanning micromirror device to induce oscillation of the first scanning micromirror device or a platform thereof; and controlling current flow in a second conducting coil of a second scanning micromirror device to induce oscillation of the second scanning micromirror device or a platform thereof.

In another aspect, methods of making scanning micromirror devices using microfabrication techniques are disclosed. Specific example methods are described below in the detailed description and figures. Further, additional features, benefits, and embodiments are described below in the detailed description, figures, and claims.

BRIEF DESCRIPTION OF THE DRAWINGS

FIG. 4 provides an overview of an example method for projecting an image using a two-dimensional scanning micromirror device.

DETAILED DESCRIPTION

Described herein are scanning micromirror devices, methods of making scanning micromirror devices, two-dimensional optical scanning systems that incorporate scanning micromirror devices, and methods of projecting light and images using two-dimensional optical scanning systems. The disclosed two-dimensional optical scanning systems can incorporate a first scanning micromirror device oscillating at a relatively higher frequency, which directs reflected light onto a second scanning micromirror device oscillating at a relatively lower frequency, which directs reflected light for projection.

The disclosed scanning micromirror devices exhibit features providing benefits for two-dimensional optical scanning and image projection. For example, some of the scanning micromirror devices are constructed to achieve a high degree of flatness of the reflective element of the scanning mirror, while allowing for good or precise control over the oscillation of the scanning micromirror. Some of the scanning micromirror devices can incorporate sensor elements and control elements to allow for monitoring of conditions, like temperature, strain or position. Some of the scanning micromirror devices can incorporate actuators, such as for altering a relative position of a reflective element or to change or achieve a high or higher degree of flatness. The disclosed scanning micromirror devices can employ electromagnetic actuation, where a conducting coil is position on a platform of the scanning micromirror devices to apply magnetic forces to induce oscillation of the scanning micromirror devices.

In some cases, the disclosed scanning micromirror devices can be very thick, such as thicker than conventional scanning micromirror devices, which may allow for improved flatness of reflectors on platforms of the scanning micromirror devices. In some examples, the thickness of the platform of the scanning micromirror device may be in the range from 100 µm to 500 µm, such as from 100 µm to 150 µm, from 150 µm to 200 µm, from 200 µm to 250 µm, from 250 µm to 300 µm, from 300 µm to 350 µm, from 350 µm to 400 µm, from 400 µm to 450 µm, from 450 µm to 500 µm, or any value between the indicated ranges. In some cases, thicker platforms may increase the power requirements for driving oscillation, though operation at a natural resonance can limit the power requirements. The increased power requirements, however, can be offset by the ability to maintain flatness of the reflector, which could otherwise result in undesirable image or projection artifacts.

The disclosed scanning micromirror devices can be used for image projection, such as for projecting light for viewing by a user. In some cases, the disclosed scanning micromirror devices and image projection systems are useful for head-mounted display devices, such as due to their compact size and ability to project high quality images using low power operation.

Figure 1:
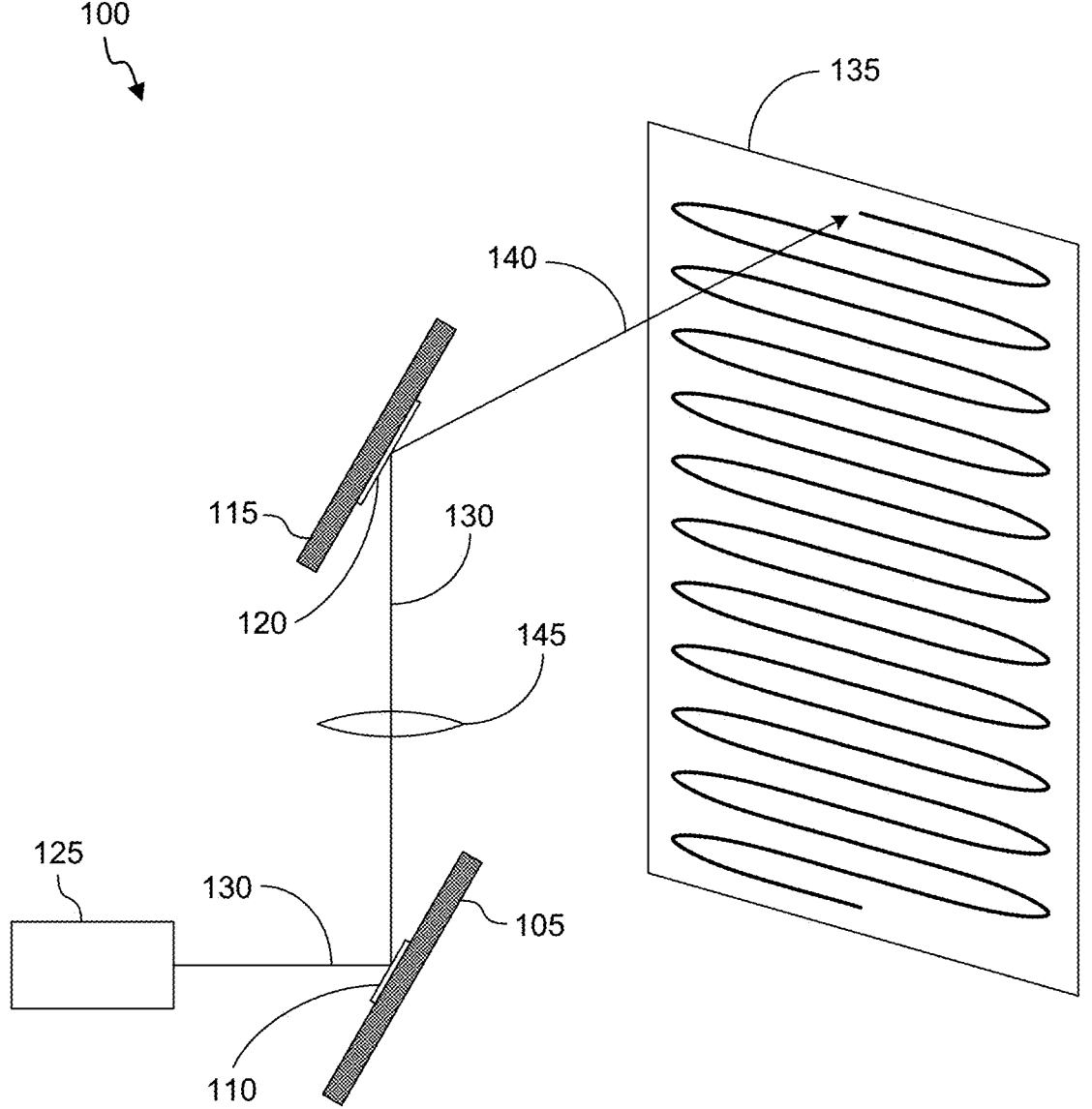
FIG. 1 provides a schematic illustration of an example image projection system.

FIG. 1 provides a schematic illustration of an example image projection system 100. Image projection system 100 comprises a first scanning micromirror device 105, including a first reflector 110, and a second scanning micromirror device 115, including a second reflector 120. Image projection system 100 also includes a light source 125 arranged in optical communication with first reflector 110 to direct light 130 from light source 125 to first reflector 110, where it is reflected towards second reflector 120 and, from there, output for projection. Motion of the first scanning micromirror device 105 and the second scanning micromirror device 115 can be driven in such a way to direct output reflected light 130 to a projection plane 135. By controlling the color, intensity, and timing of light 130 output by light source 125 with the oscillatory motion of the first scanning micromirror device 105 and the second scanning micromirror device 115, the output reflected light 140 can generate an image at projection plane 135. With repeated scanning, a sequence of images and/or video may be projected.

In some examples, the first scanning micromirror device 105 can oscillate about a first axis so that output reflected light 140 can form a series of horizontal (left-to-right and right-to-left) passes, while the second scanning micromirror device 115 can oscillate about a second axis so that output reflected light 140 can also oscillate vertically from top-to-bottom and/or from bottom-to-top across projection plane 135. The oscillation frequency along the horizontal direction can be very fast, such as in the range from 1 kHz to 10 MHz, for example. Some projection systems may use an oscillation pattern along the vertical direction that is a sawtooth or triangular shape, which can be useful for creating regularly spaced horizontal passes in one vertical direction (e.g., from top-to-bottom), though sinusoidal oscillations patterns may also be used. The oscillation frequency along the vertical direction can be slower, such as in the 15 Hz to 2 kHz range, for example. If only top-to-bottom repeated projections are desired, a blanking period can be used where no light is generated by light source 125 while the second scanning micromirror device 115 oscillates in the upward direction. In some cases, however, both top-to-bottom and bottom-to-top projections can be used. Blanking periods can also be used on the extremes of the horizontal dimension to avoid projection at the side edges of projection plane 135.

It will be appreciated that reference to horizontal (or left-to-right and right-to-left) directions and vertical (or bottom-to-top and top-to-bottom) are merely one example of labeling, referenced to the orientation of projection plane 135 shown in FIG. 1. Other configurations where horizontal and vertical direction labels are switched or where other labels are used are contemplated within the scope of the present disclosure.

Image projection system 100 can be a component of an optical projector, for example, which can be used to project still images or video images at a projection plane. In some cases, the image projection system 100 can be a component of a head-mounted display device and/or used to couple projected light into an eyepiece, such as an eyepiece of a head-mounted display device. Projection plane 135 may correspond to an eyepiece or a user's retina, in some examples. Image projection system 100 can optionally include projection optics, such as mirrors, lenses, collimators, filters, gratings, or the like, which are not illustrated in FIG. 1, but can be positioned in the optical path between the light source 125 and the projection plane 135, for example. In some cases, an optical relay 145, such as comprising multiple reflective and/or focusing elements, can be used between the first scanning micromirror device 105 and the second scanning micromirror device 115 to direct light reflected from the first mirror 110 onto the second mirror 120. Light source 125 can be a single or multi-color light source and can include a light emitting diode or laser source, for example, which can be output switchable or modulatable at a high rate, such as up to 100 MHz, for example. Optionally, light source 125 can comprise or correspond to multiple individually modulatable light sources, such as outputting different colors (e.g., red, green, blue).

Figures 2A, 2B:
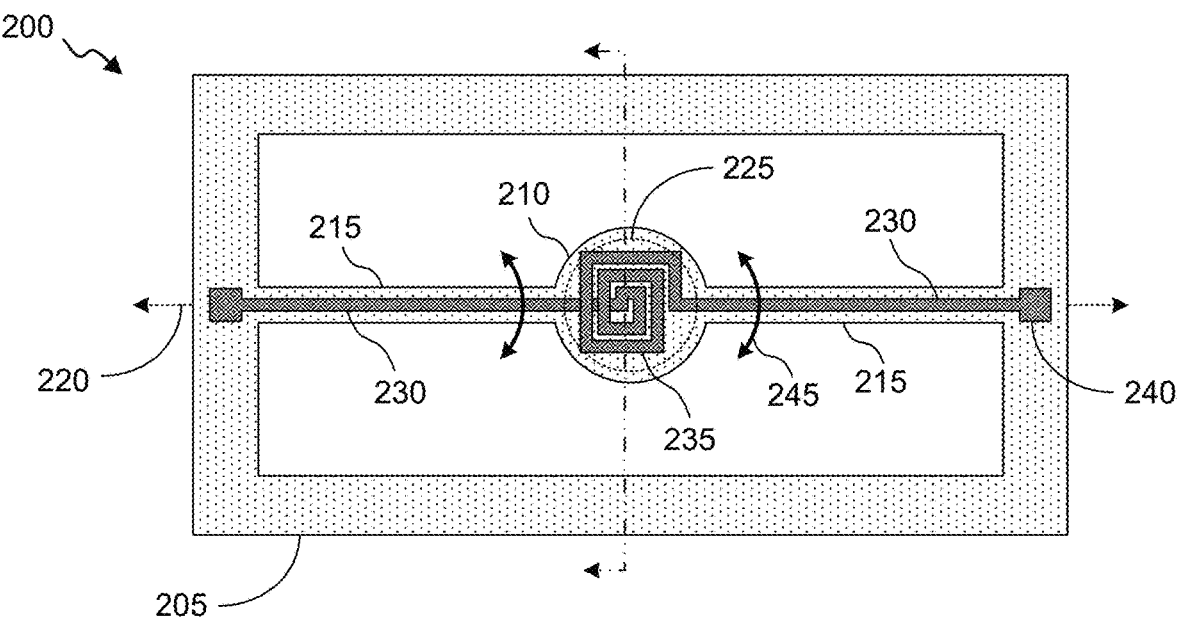
FIG. 2A shows a bottom-side schematic illustration of an example scanning micromirror device.
FIG. 2B shows a cross-sectional schematic illustration of an example scanning micromirror device.

FIG. 2A provides a schematic illustration of an example scanning micromirror device 200. Scanning micromirror device 200 can comprise silicon or other materials, allowing patterning and fabrication according to known microfabrication techniques. Scanning micromirror device 200 includes a base 205 and a platform 210, which is coupled to base 205 by a plurality of support flexures 215. Support flexures 215 are constructed and arranged to allow for oscillation of platform 210 about axis 220, as shown schematically by arrow 245. The specific configuration of support flexures 215 shown in FIG. 2A may also be referred to in some cases as torsion beams, due to the way they support oscillation of platform 210 about axis 220 by partial rotation with respect to base 205. Although base 205 is depicted in FIG. 2A as a frame surrounding other components, base 205 may extend in other directions or be positioned differently with respect to platform 210, such as beneath first platform 210, for example. A reflector 225 may be positioned on the opposite surface of platform 210 as that shown in FIG. 2A.

Scanning micromirror device 200 also includes conductive trace 230, which forms a conductive coil 235 at platform 210. Conductive coil 235 can be used for applying forces (e.g., magnetic/electromagnetic forces) to platform 210 to induce oscillation of platform 210 about axis 220. Conductive coil 235 can have any suitable number of turns. In some cases, the conductive traces 230, which provide a way to pass current from a current source via contacts 240 to conductive coil 235, can add to the stiffness of the support flexures 215. Since the support flexures 215 can flex and/or move during oscillation with rotation of support flexures 215, the additional stiffness imparted by conductive trace 230 can be time dependent, as the extra stiffness can depend on the scan angle, and this can result in some nonlinearities for oscillation of the platform 210 about axis 220. Narrower and/or thinner conductive traces 230 can counteract or minimize the nonlinearities, though smaller or thinner conductive traces 230 can increase the resistance and power consumption of the device, so it may be advantageous, in some embodiments, for conductive traces 230 to be wider, such as occupying as much of the surface (i.e., up to the full width) of support flexures 215 as practicable. Further, the conductive traces 230 can be positioned both on the side of scanning micromirror device 200 shown in FIG. 2A, as well as on the opposite side, to counterbalance the perturbations. In addition to electromagnetic actuation achieved using conductive coil 235, other actuators may be used, such as piezoelectric actuators, electrostatic actuators, or the like. In some cases, piezoelectric actuators or electrostatic actuators can be used for sensing a position, scan angle, or oscillation, of platform 210.

FIG. 2B shows a schematic cross-sectional view of an example scanning micromirror device 200. It will be appreciated that the configurations shown in FIGS. 2A and 2B are merely examples and may not be to scale. In FIG. 2B, axis 220 extends in and out of the plane, with oscillation of platform 210 shown schematically by arrow 245. A magnetic source 250 is shown, positioned to provide a magnetic field at platform 210. The magnetic field can interact with current flowing through conductive coil 235 for imparting forces on platform 210 to induce oscillation, such as by passing an alternating current through conductive coil 235. In addition or alternative to electromagnetic actuation, other forms of actuators, such as piezoelectric actuators or electrostatic actuators can be used. Reflector 225 is shown on the opposite side of platform 210. Reflector 225 may comprise a metal reflector or a dielectric reflector, or a combination, for example.

The presence of conductive coil 235 may apply stresses to platform 210, which can result in perturbations to the flatness of reflector 225. To counterbalance the impact of the stresses imparted by conductive coil 235, a stress relief layer 255 may be positioned between reflector 225 and platform 210. Stress relief layer 255 can apply stresses to platform 210 opposite those of conductive coil 235. Stress relief layer 255 and conductive coil 235 may be the same material and/or may have the same volume on platform 210 to minimize or reduce the total applied stresses and limit the perturbations to the flatness of reflector 225.

The configuration of scanning micromirror device 200 may be useful for relatively high frequency oscillation, such as in the range from 1 kHz to 10 MHz, for example. To reduce the power consumed for driving the actuation and oscillation of platform 210, the device may be operated at its resonant frequency, which can result in a quality factor (Q), which can amplify the displacement achieved through actuation. Accordingly, the natural resonant frequency for oscillation of platform 210 about axis 220 may be in the range from 1 kHz to 10 MHz.

Figure 2C:
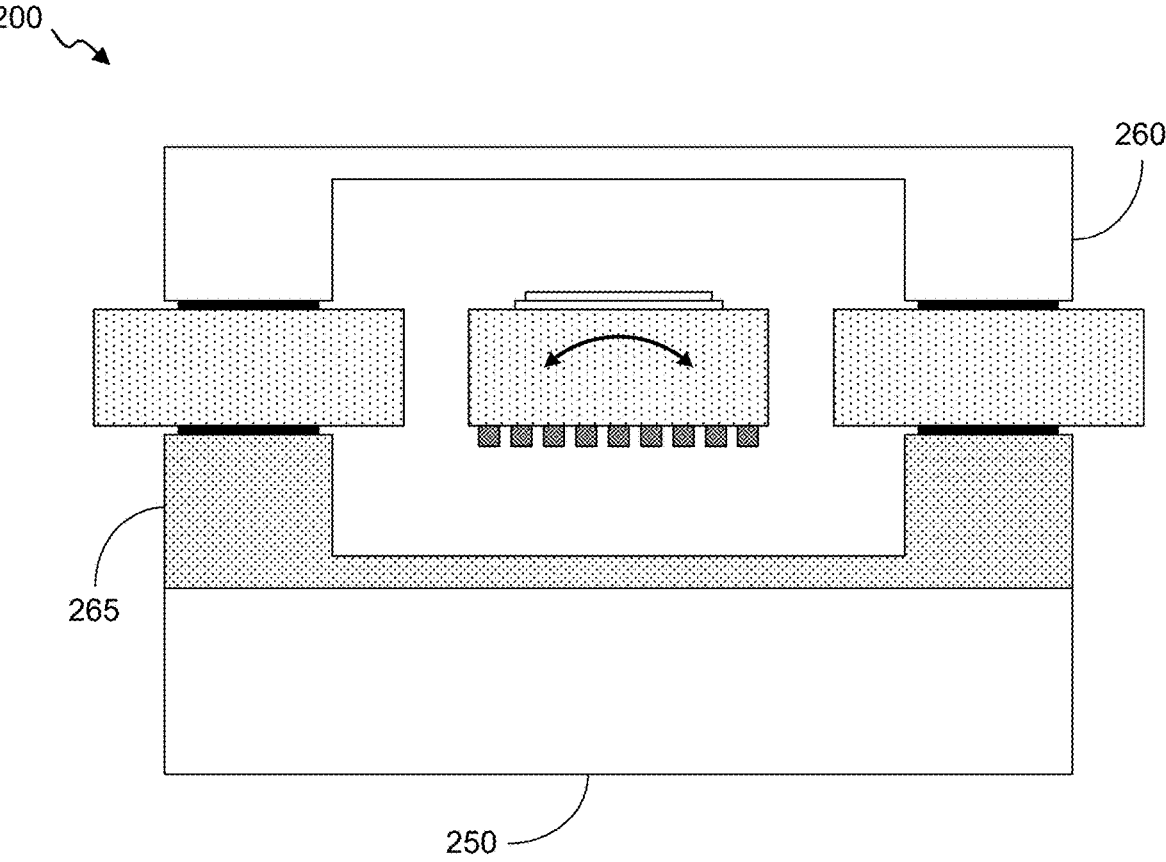
FIG. 2C shows a cross-sectional schematic illustration of an example scanning micromirror device in a hermetic or vacuum packaging.

Further improvements in the quality factor can be achieved, in some cases, by using vacuum or hermetic packaging. FIG. 2C shows a cross sectional schematic illustration of a scanning micromirror device 200 including a vacuum packaging. Vacuum packaging may include a transparent top component 260 and a bottom component 265. Top component 260 may be transparent, so as to allow light transmission therethrough, and may optionally include an antireflective coating on one or more surfaces to minimize surface reflections. Example materials for top component 260 may include glass or crystalline materials. Bottom component 265 can be positioned adjacent to magnetic source 250, and can comprise a transparent or non-transparent material. In some examples, bottom component 265 can comprise silicon. Top component 260 and bottom component 265 may be sealed against base 205, such as using glass frit paste.

Figures 3A, 3B:
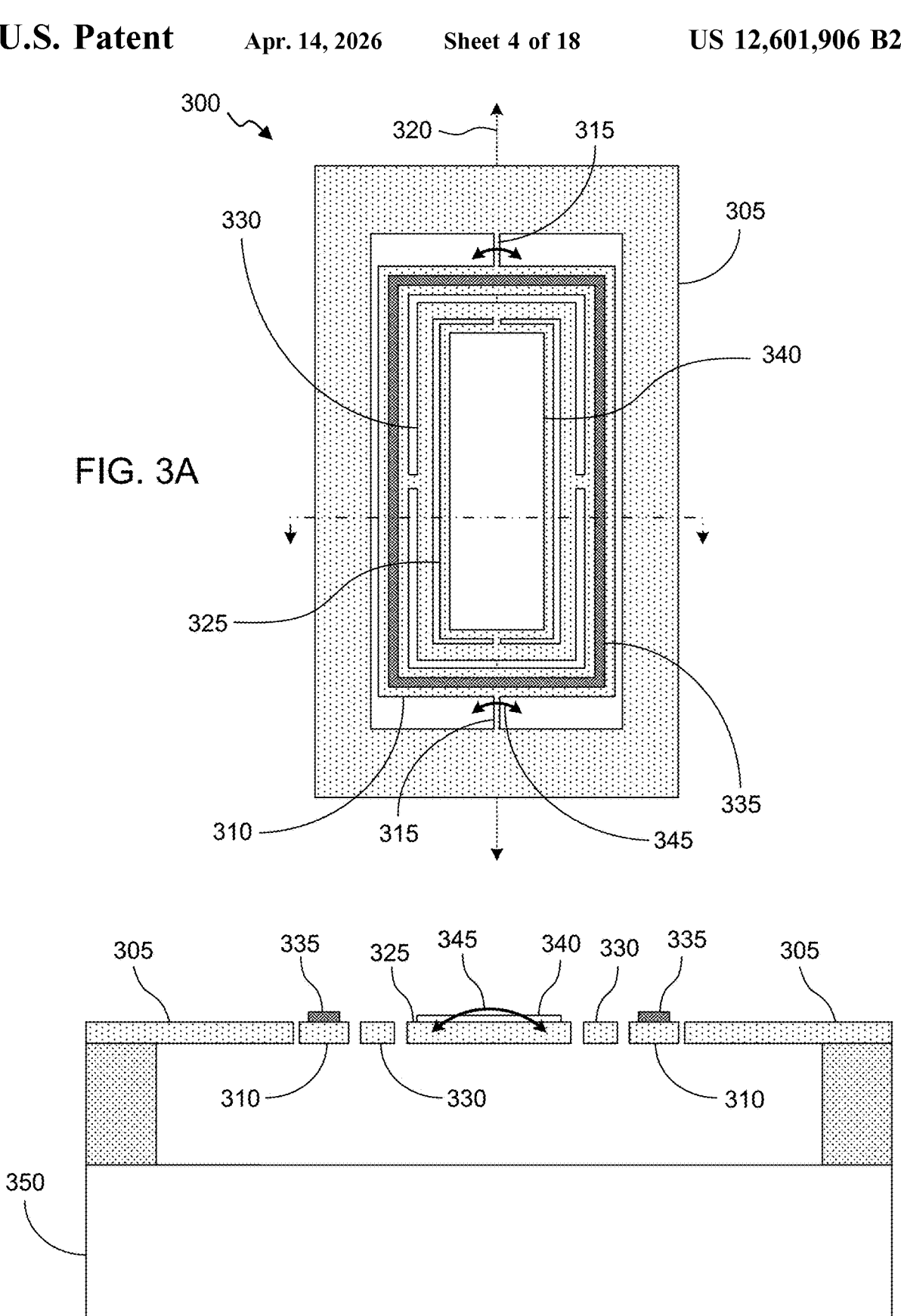
FIG. 3A shows a top-side schematic illustration of an example scanning micromirror device.
FIG. 3B shows a cross-sectional schematic illustration of an example scanning micromirror device in cross-section.

FIG. 3A and FIG. 3B provide a top and cross-sectional schematic illustrations, respectively, of another example scanning micromirror device 300. Scanning micromirror device 300 can comprise silicon or other materials, allowing patterning and fabrication according to known microfabrication techniques. Scanning micromirror device 300 includes a base 305, a first frame 310, which is coupled to base 305 by a plurality of support flexures 315. Support flexures 315 are constructed and arranged to allow for oscillation of first frame 310, and internal or associated components, about axis 320, as shown schematically by arrow 345. Scanning micromirror device 300 also includes a platform 325 and a second frame 330 positioned between platform 325 and first frame 310. A conductive coil 335 is shown positioned on first frame 310, and a reflector 340 is shown positioned on platform 325. Conductive traces (not shown) may pass across support flexures 315 to provide current to and/or from conductive coil 335. Conductive coil 335 can have any suitable number of turns.

A magnetic source 350 is shown, positioned to provide a magnetic field at first frame 310. The magnetic field can interact with current flowing through conductive coil 335 for imparting forces on first frame 310 to induce oscillation of first frame 310, second frame 330, and platform 325 about axis 320, such as by passing an alternating current through conductive coil 335. In addition or alternative to electromagnetic actuation, other forms of actuators, such as piezoelectric actuators or electrostatic actuators can be used.

Reflector 340 is shown positioned on platform 325. Reflector 225 may comprise a metal reflector or a dielectric reflector, or a combination, for example. In the configuration shown in FIG. 3A, reflector 340 has a length along a direction parallel to axis 320 that is longer than along a direction perpendicular to axis 320. Such a configuration may be useful for allow for light received at reflector 340 to oscillate along the direction of axis 320, which may occur as a result of the light received at reflector 340 coming from another scanning micromirror device, causing oscillation of the light.

The configuration of scanning micromirror device 300 may be useful for relatively low frequency oscillation, such as in the range from 15 Hz to 2 kHz, for example. To reduce the power consumed for driving the actuation and oscillation of platform 325, the device may be operated at its resonant frequency, which can result in a quality factor (Q), which can amplify the displacement achieved through actuation. Accordingly, the natural resonant frequency for first frame 310, second frame 330, and platform 325 about axis 320 may be in the range from 15 Hz to 2 kHz. Support flexures 315 may be constructed to support such oscillatory operation.

Figures 3C, 3D:
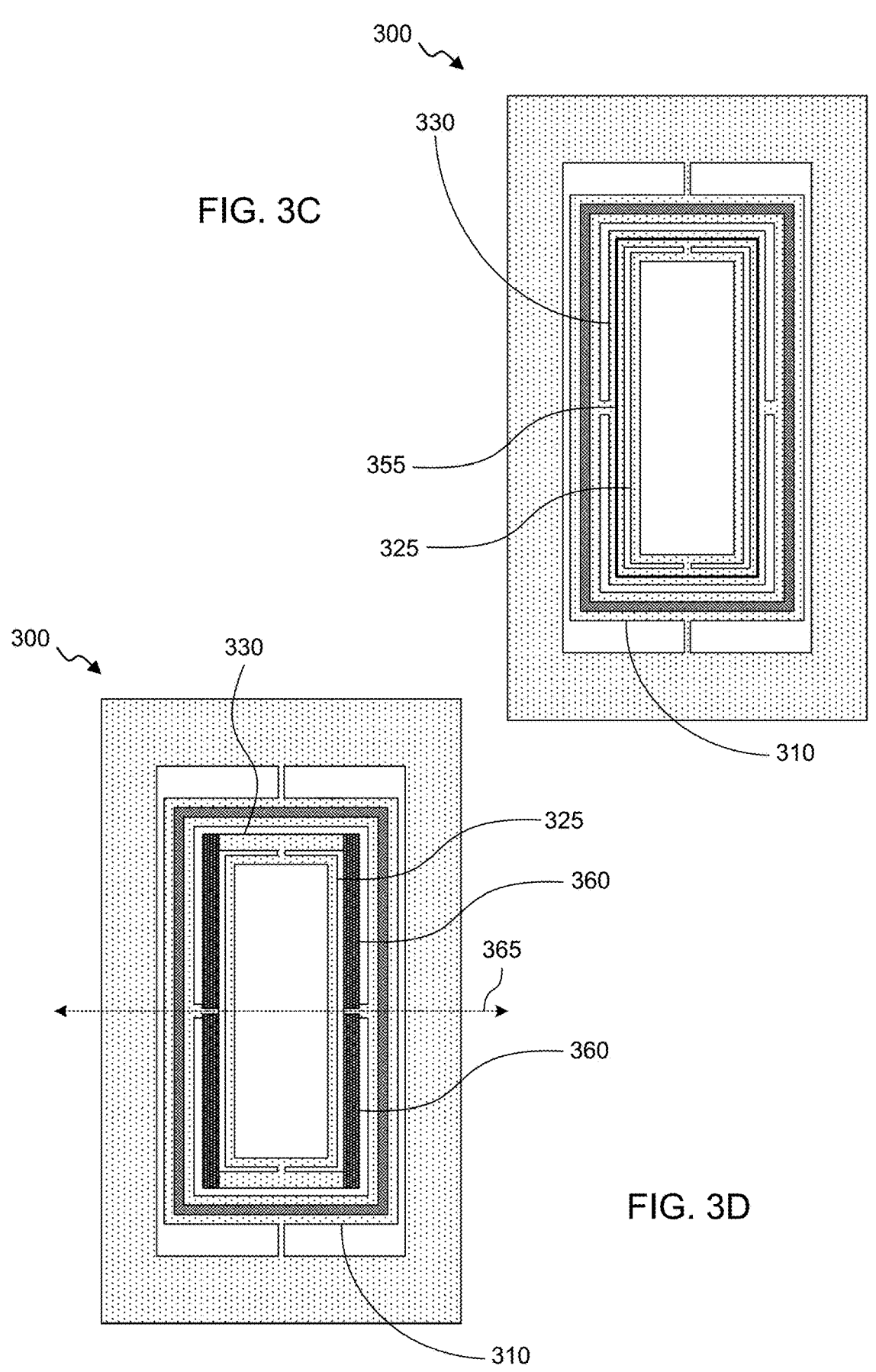
FIG. 3C and FIG. 3D provide schematic illustrations of an example scanning micromirror device to illustrate additional features.

The use of second frame 330 between first frame 310 and platform 325 allows for inclusion of additional components in scanning micromirror device 300. For example, as shown in FIG. 3C, a resistor 355 can be positioned on second frame 330. Such a resistor 355 can be used for evaluating of a temperature of scanning micromirror device 300, such as by using a resistor 355 that has a resistance that is a function of temperature (i.e., a thermistor). Conductive access lines used for electrical communication with resistor 355 are not shown in FIG. 3C.

In another example, piezoelectric actuators 360 can be positioned on second frame 330, as shown in FIG. 3D. Again, conductive access lines used for electrical communication with piezoelectric actuators 360 are not shown in FIG. 3D. Piezoelectric actuators 360 can be used for sensing and/or controlling a flatness and/or position of platform 325 about second axis 365. Piezoelectric actuators 360 can be used as strain sensors to sense a position of second frame 330. For example, piezoelectric actuators 360 can generate a voltage if second frame 330 and platform 325 deform with respect to axis 365, providing a way to detect the position or flatness. Voltages can be applied to piezoelectric actuators 360 to alter a tilt of second frame and platform 325 with respect to axis 365, such as where piezoelectric actuators 360 all cause a deformation that results in a deflection in corresponding directions about axis 365 (e.g., to cause one end of frame 330 to tip up and the other end of frame 330 to tip down). Alternatively, voltages can be applied to piezoelectric actuators 360 to alter a curvature of second frame and platform 325 with respect to axis 365, such as where piezoelectric actuators 360 cause deformation on opposite sides of axis 365 that results in coordinated deflection about axis 365 (e.g., to cause one end of frame 330 to tip up and the other end of frame 330 to also tip up).

In some cases, scanning micromirror device 300 can be packaged in a vacuum or hermetic packaging, similar to that described above with respect to scanning micromirror device 200. Since scanning micromirror device 300 may be configured for relatively lower frequency operation, such packaging is optional and may not be preferred for all embodiments.

Turning next to FIG. 4, an overview of an example method 400 is depicted. Method 400 may correspond, for example, to a method of projecting an image, such as using multiple scanning micromirror devices. At block 402, a two-dimensional optical scanning system is provided, such as a two-dimensional optical scanning system including a first scanning micromirror device and a second scanning micromirror device (e.g., like image projection system 100). The scanning micromirror devices may comprise, for example, one or multiple of scanning micromirror device 200 or scanning micromirror device 300 or one of each scanning micromirror device 200 and scanning micromirror device 300.

Method 400 includes steps 404, and 406 where different resonant oscillations of the scanning micromirror devices are induced. Although steps 404 and 406 are indicated as inducing oscillation of the first scanning micromirror device and then inducing oscillation of the second scanning micromirror device, oscillation of the scanning micromirror devices may be induced in any order or simultaneously. Inducing oscillation of a scanning micromirror device may include passing currents, such as alternating currents, through conducting coils of the scanning micromirror devices.

At block 408, a reflector of the first scanning micromirror device is illuminated, such as using a controllable light source, which may be a multicolor light source. The reflector of the first scanning micromirror device may reflect light from the light source to generate reflected light that is directed to a reflector of the second scanning micromirror device. An optical relay may optionally be positioned between the first scanning micromirror device and the second scanning micromirror device to provide optical communication, such as in a folded beam configuration, which can be useful for reducing or minimizing a size of the optical scanning system. The reflector of the second scanning micromirror device may reflect light from the first scanning micromirror device to generate output reflected light.

The output reflected light may be directed, at block 410, to an eyepiece, such as an eyepiece of a head-mounted image display device. Output optics may be incorporated between the eyepiece and the second scanning micromirror device. Example optics include lenses, reflectors, filters, diffraction gratings, prisms, or the like.

Aspects of the invention may be further understood by the following non-limiting examples.

Example 1: Manufacturing a Scanning Micromirror Device with Intermediate Frames

This example provides an overview of a fabrication scheme for making a scanning micromirror device. Various details are described in this example that will allow the skilled artisan to understand example processes used for making scanning micromirror devices useful with the image projection systems, head-mounted display systems, and two-dimensional scanning systems described herein. It will be appreciated that conventional processes may be used for some fabrication steps. Not all fabrication steps may be described in detail in this example so as not to obscure other disclosed aspects. It will be appreciated that the figures described in this example are for illustrative purposes and may not be to scale.

Figure 5A:
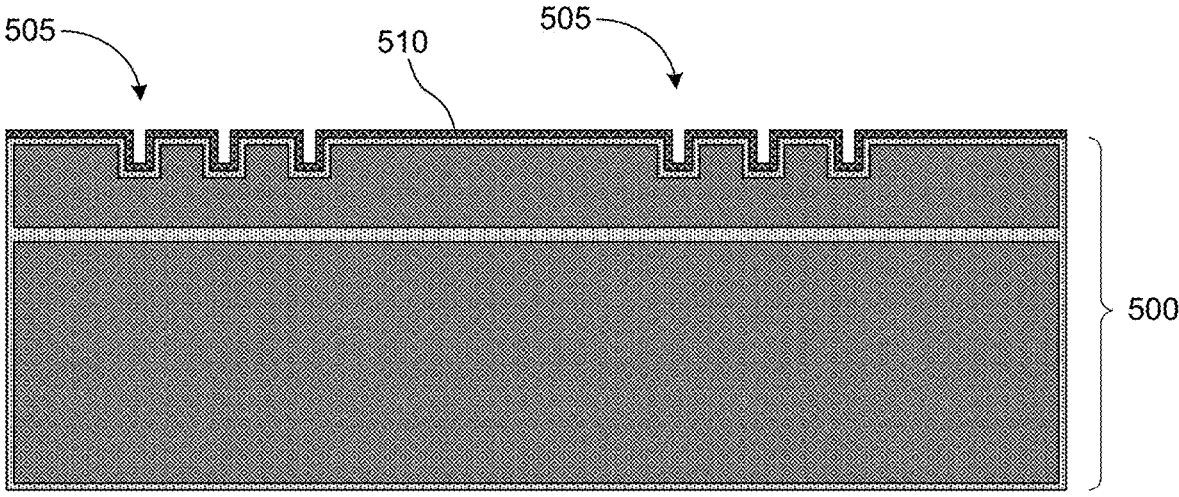
FIG. 5A, FIG. 5B, FIG. 5C, FIG. 5D, FIG. 5E, FIG. 5F, and FIG. 5G provide schematic illustrations of various points in the fabrication process for making an example scanning micromirror device.
Figure 5B:
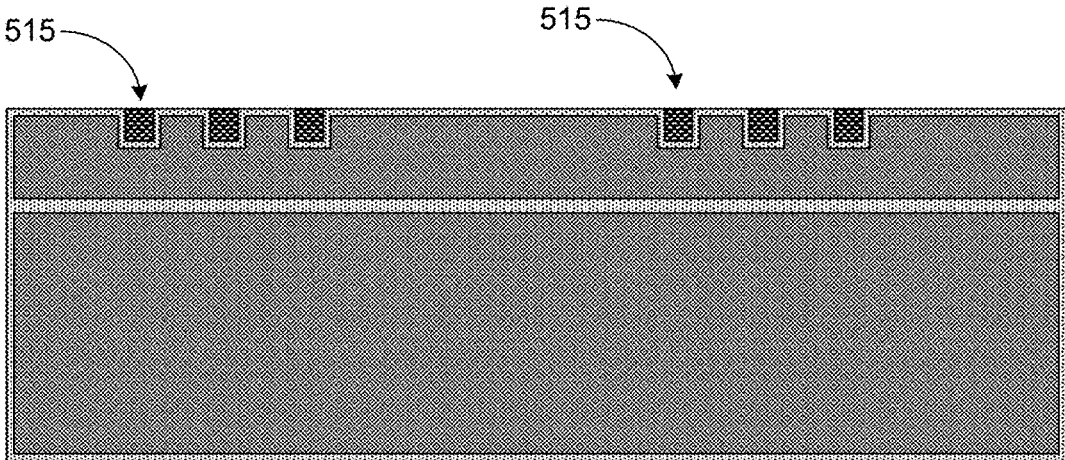
Figure 5C:
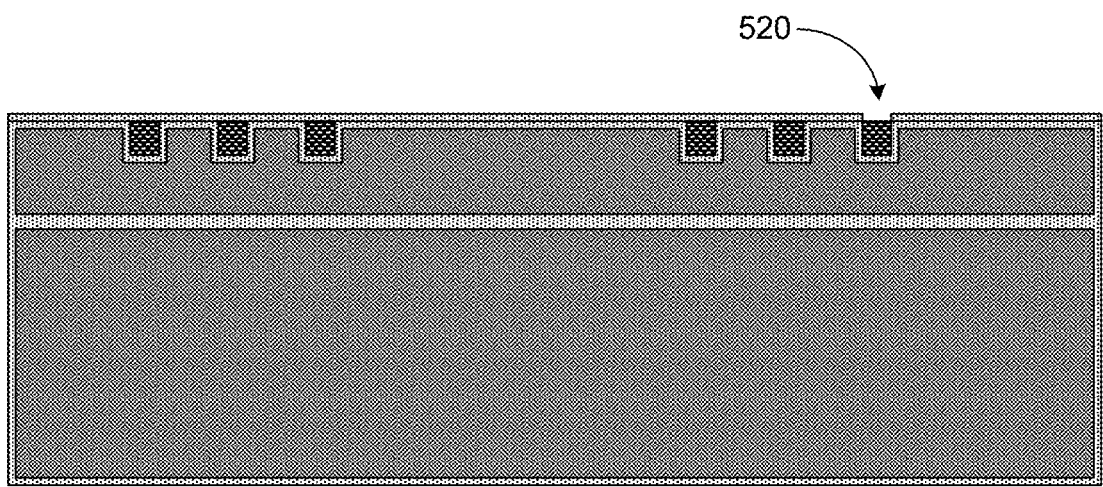
Figure 5D:
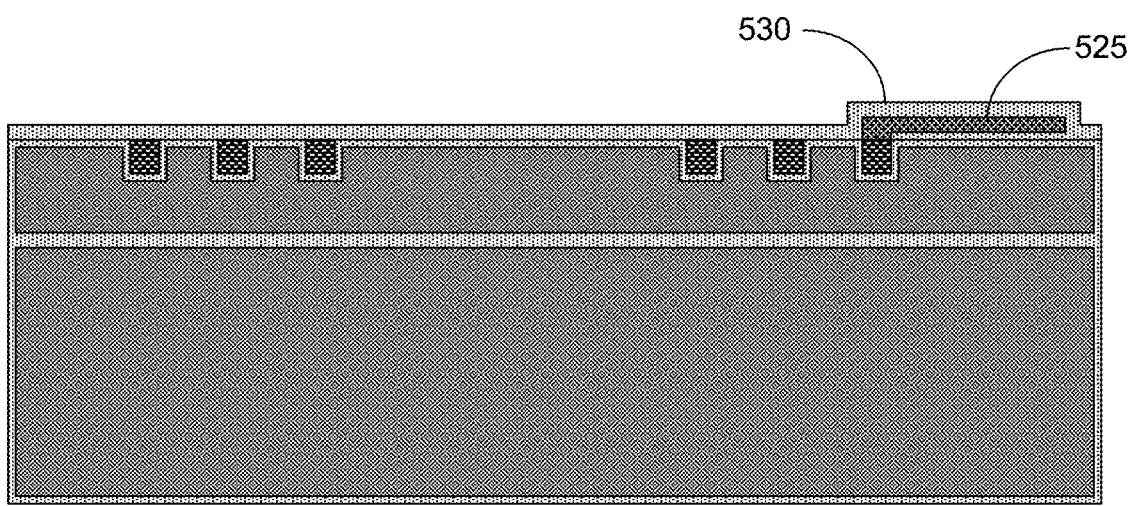
Figure 5E:
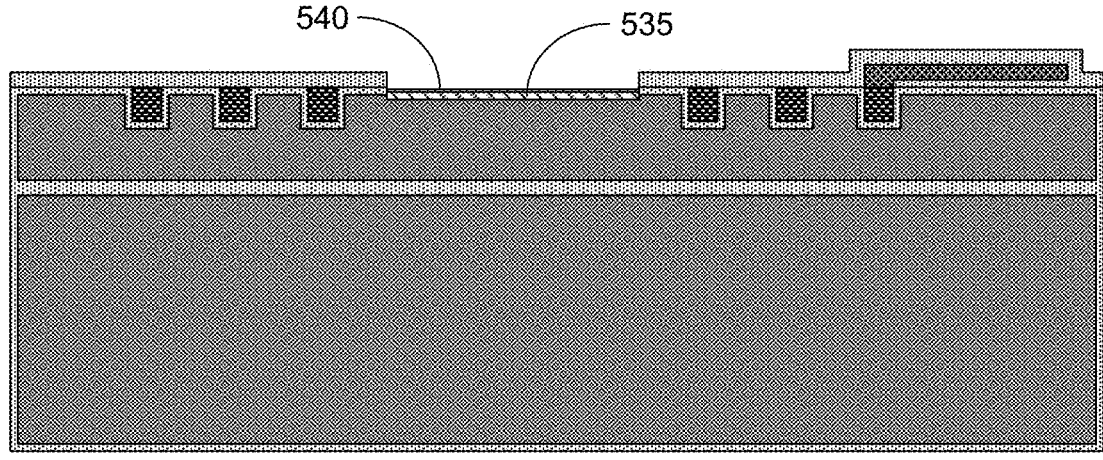
Figure 5F:
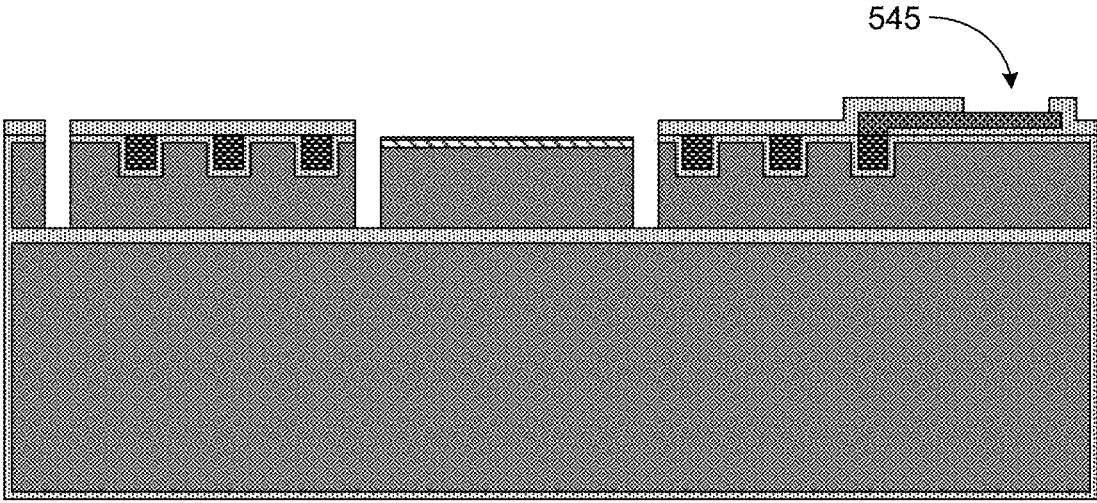
Figure 5G:
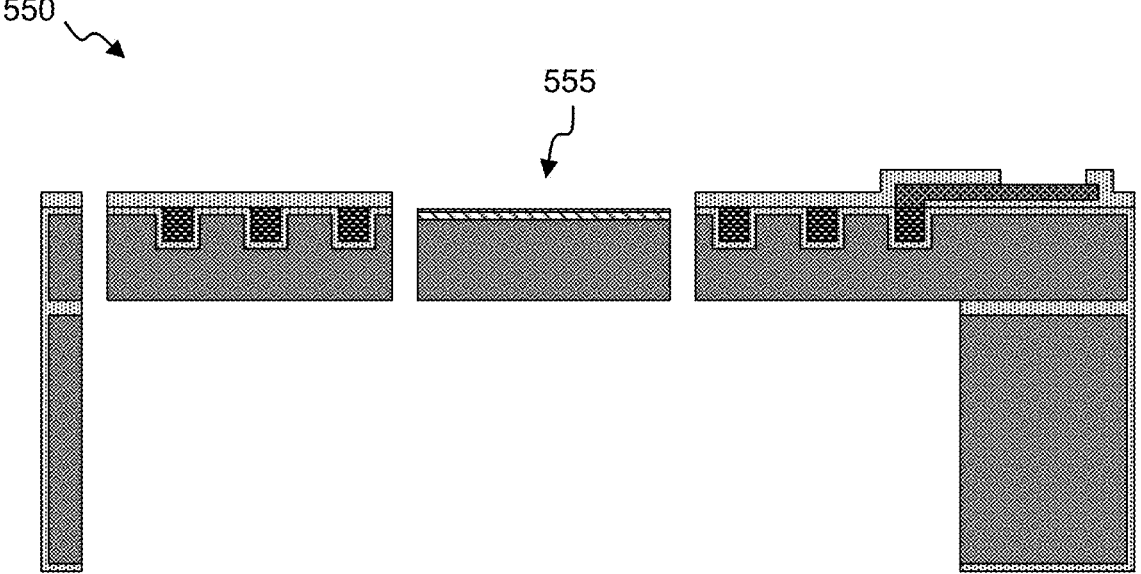
Figure 6A:
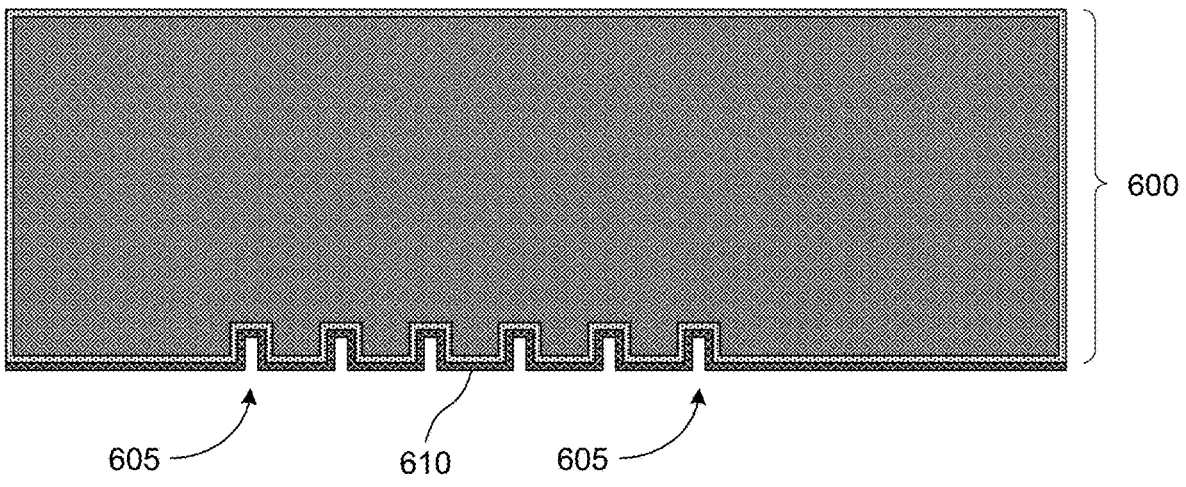
FIG. 6A, FIG. 6B, FIG. 6C, FIG. 6D, FIG. 6E, FIG. 6F, FIG. 6G, and FIG. 6H provide schematic illustrations of various points in the fabrication process for making another example scanning micromirror device.
Figure 6B:
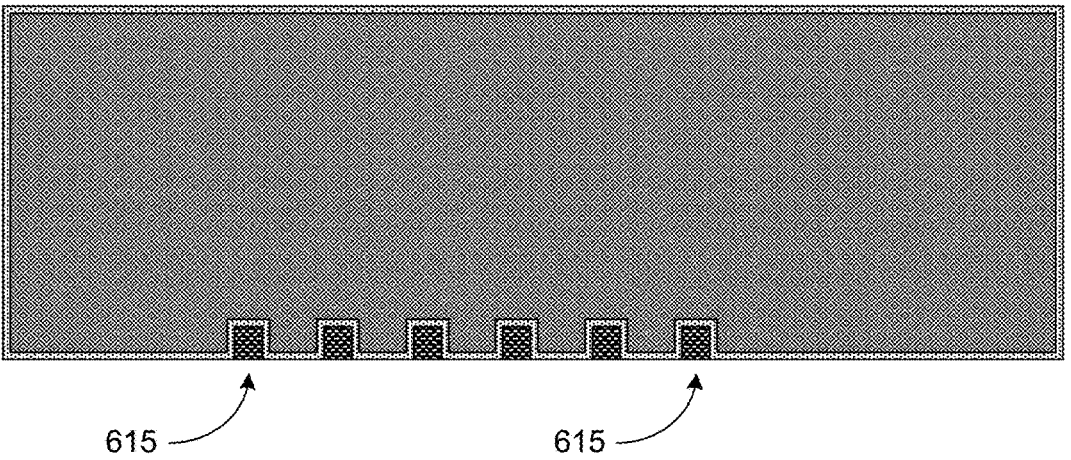
Figure 6C:
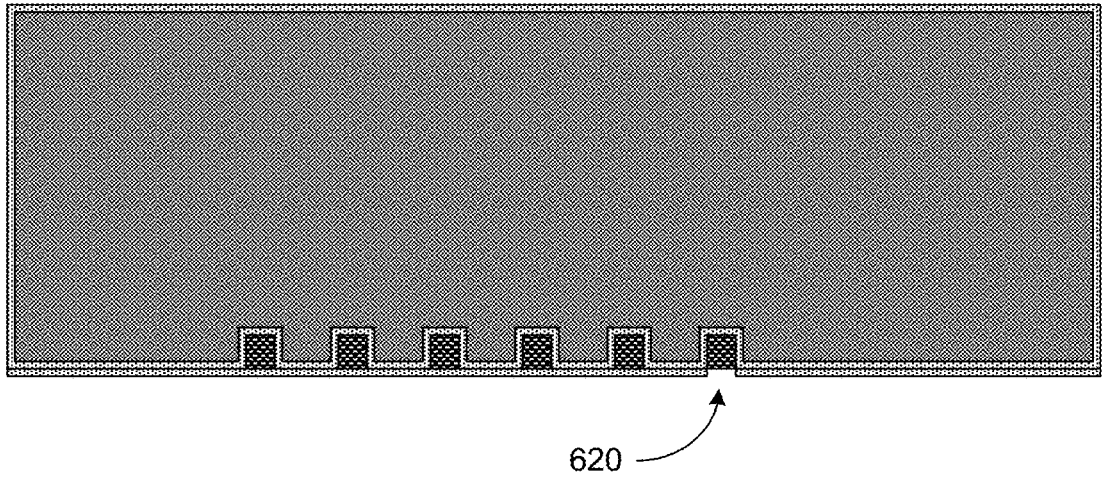
Figure 6D:
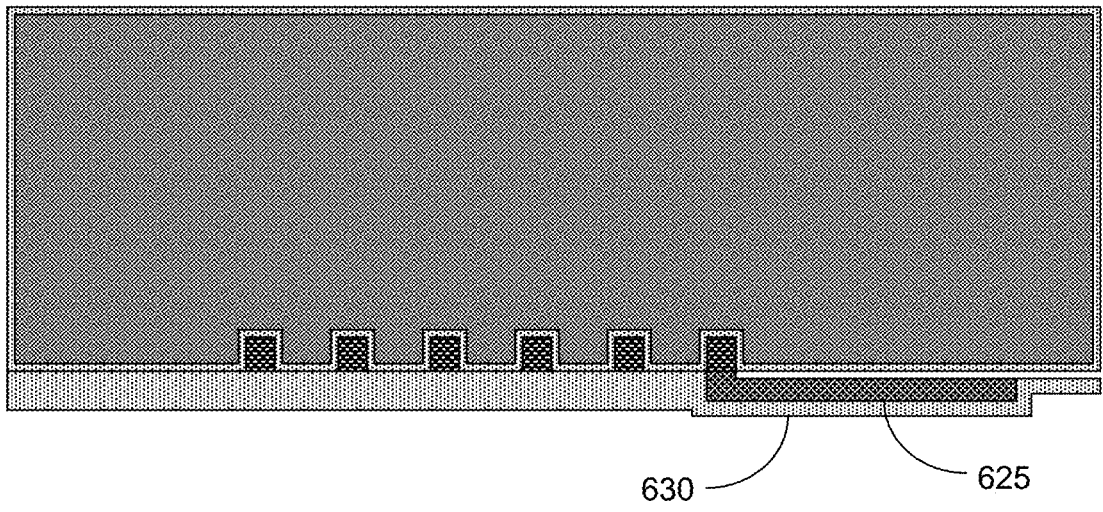
Figure 6E:
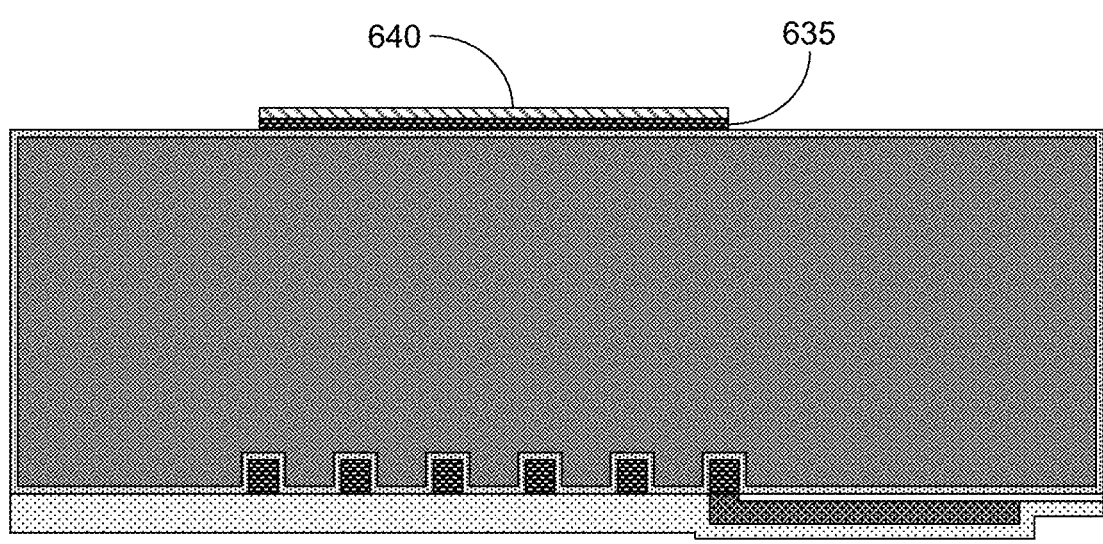
Figure 6F:
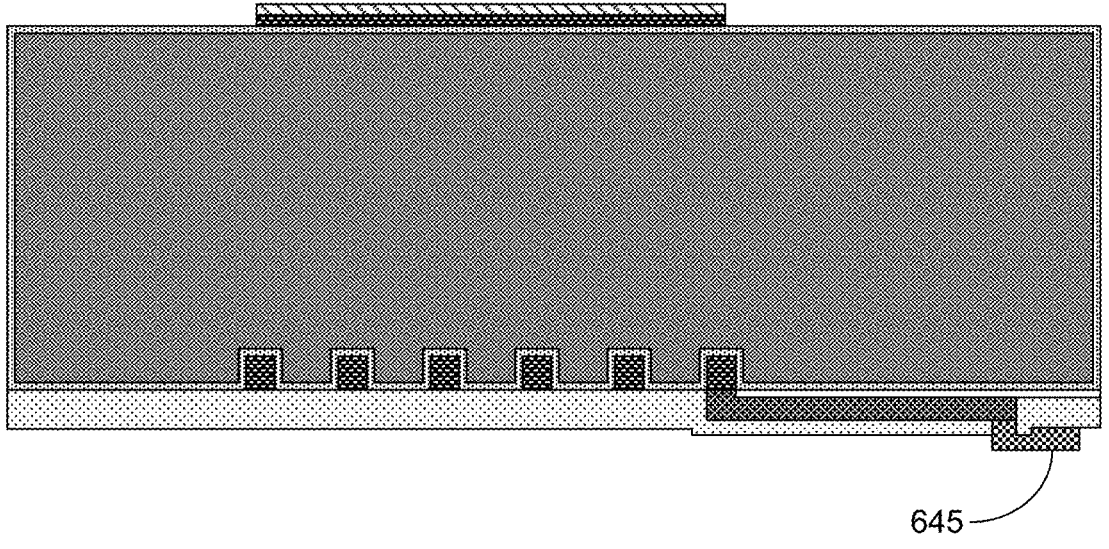
Figure 6G:
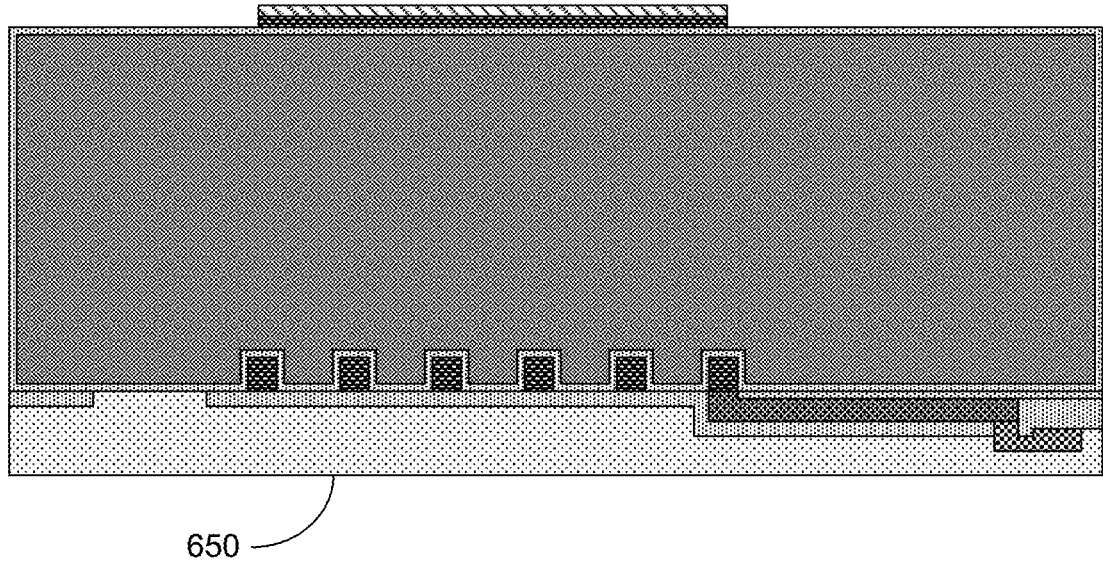
Figure 6H:
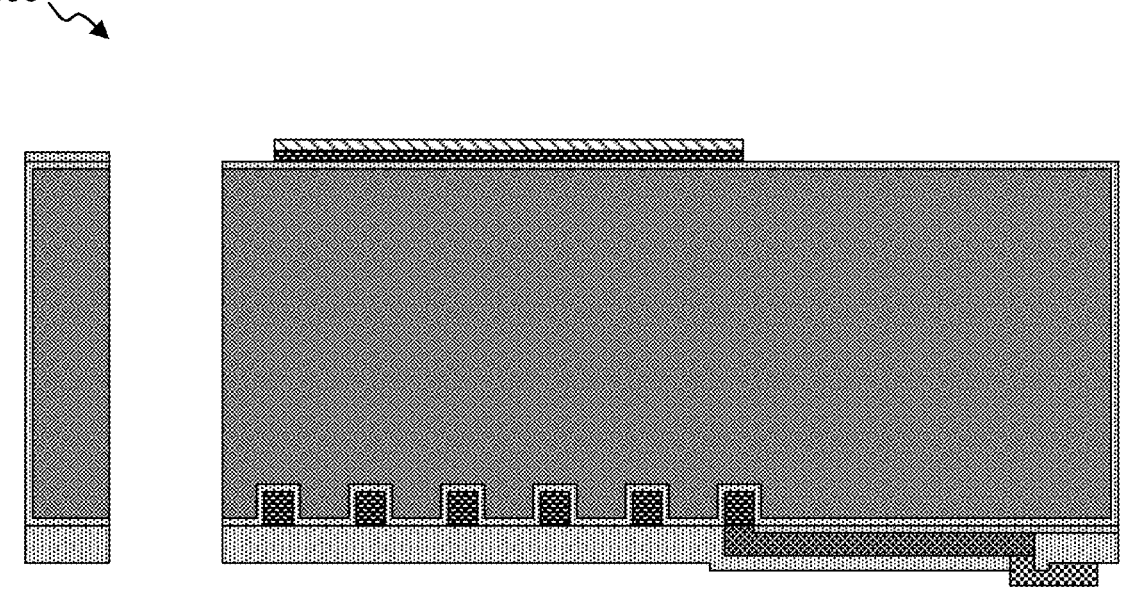
Figure 7A:
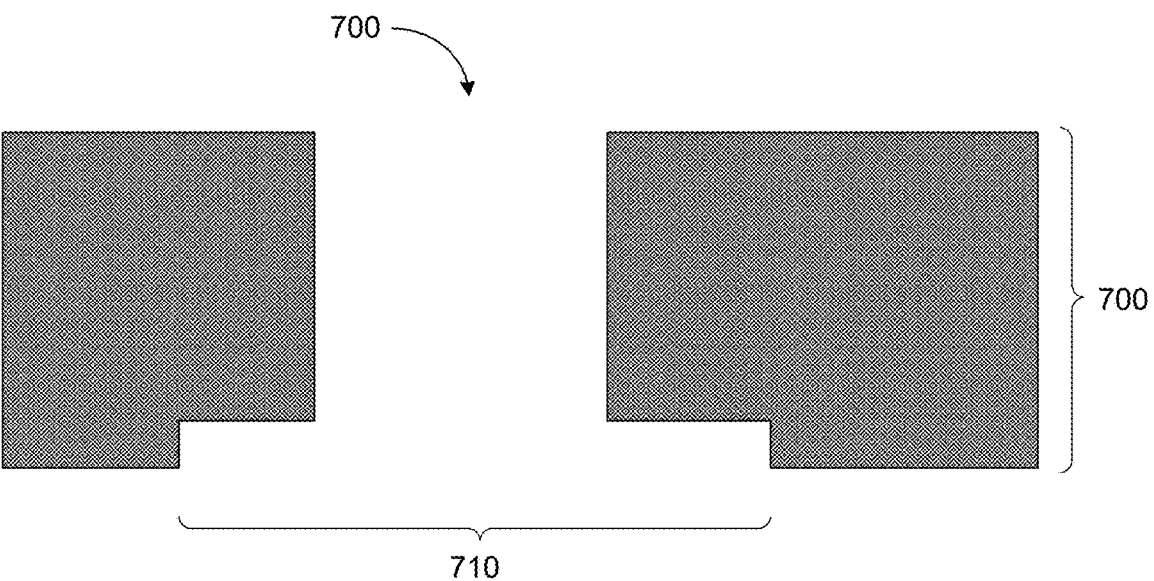
FIG. 7A, FIG. 7B, FIG. 7C, FIG. 7D, FIG. 7E, FIG. 7F, and FIG. 7G provide schematic illustrations of various points in an example fabrication/assembly process for vacuum packaging of a scanning micromirror device.
Figure 7B:
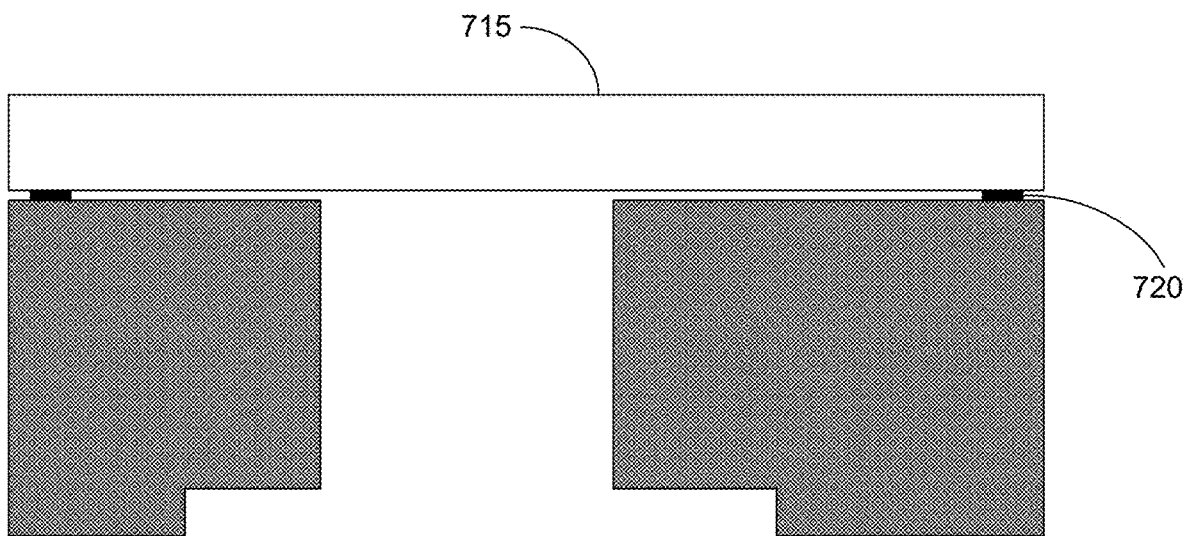
Figure 7C:
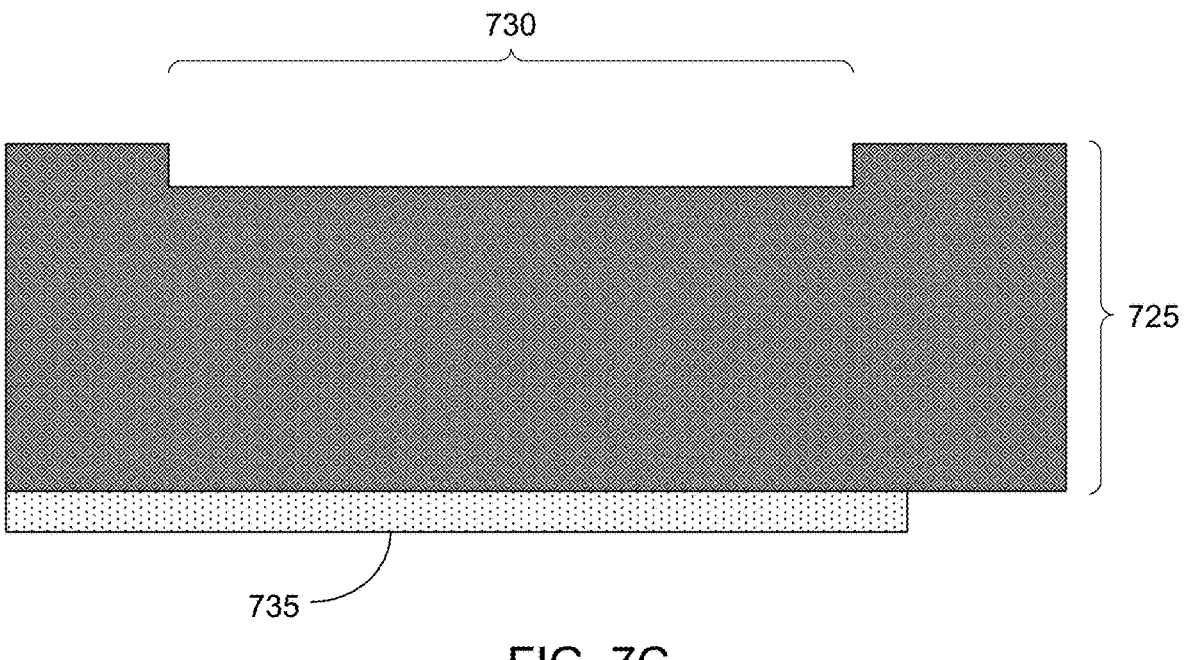
Figure 7D:
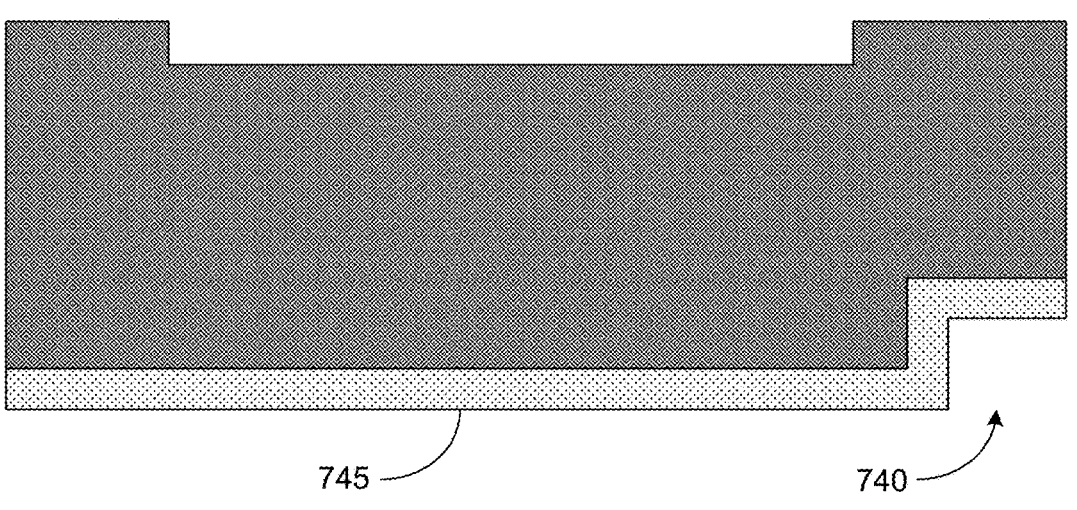
Figure 7E:
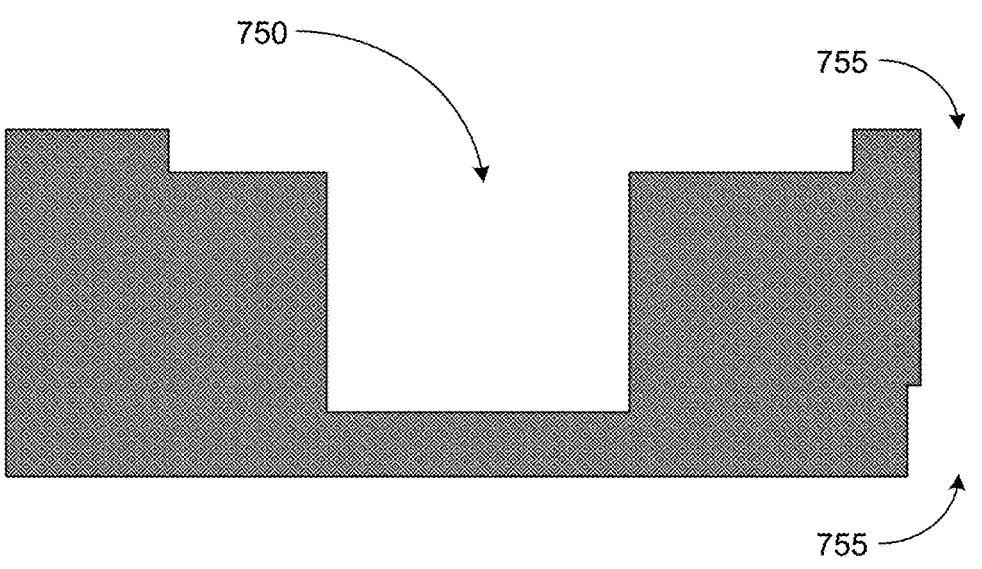
Figure 7F:
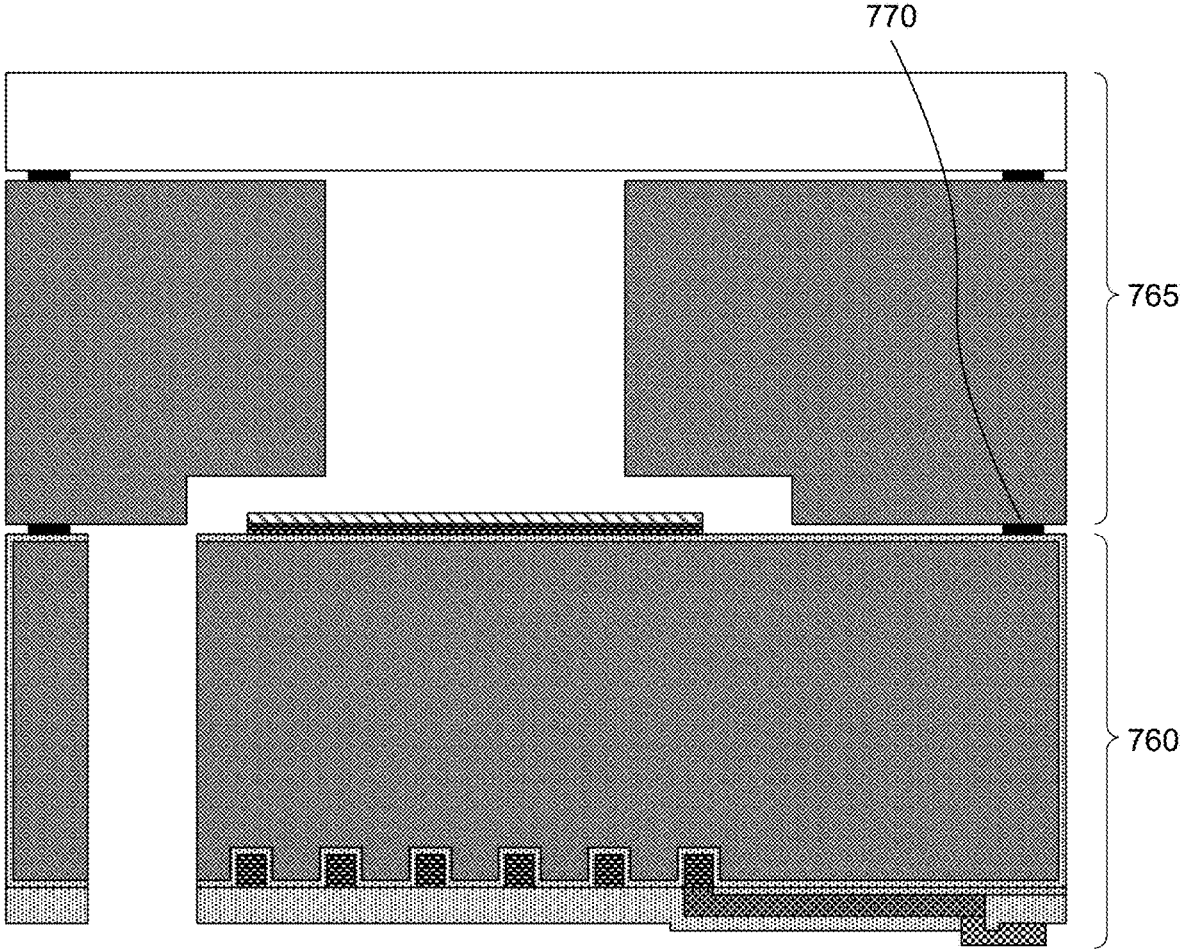
Figure 7G:
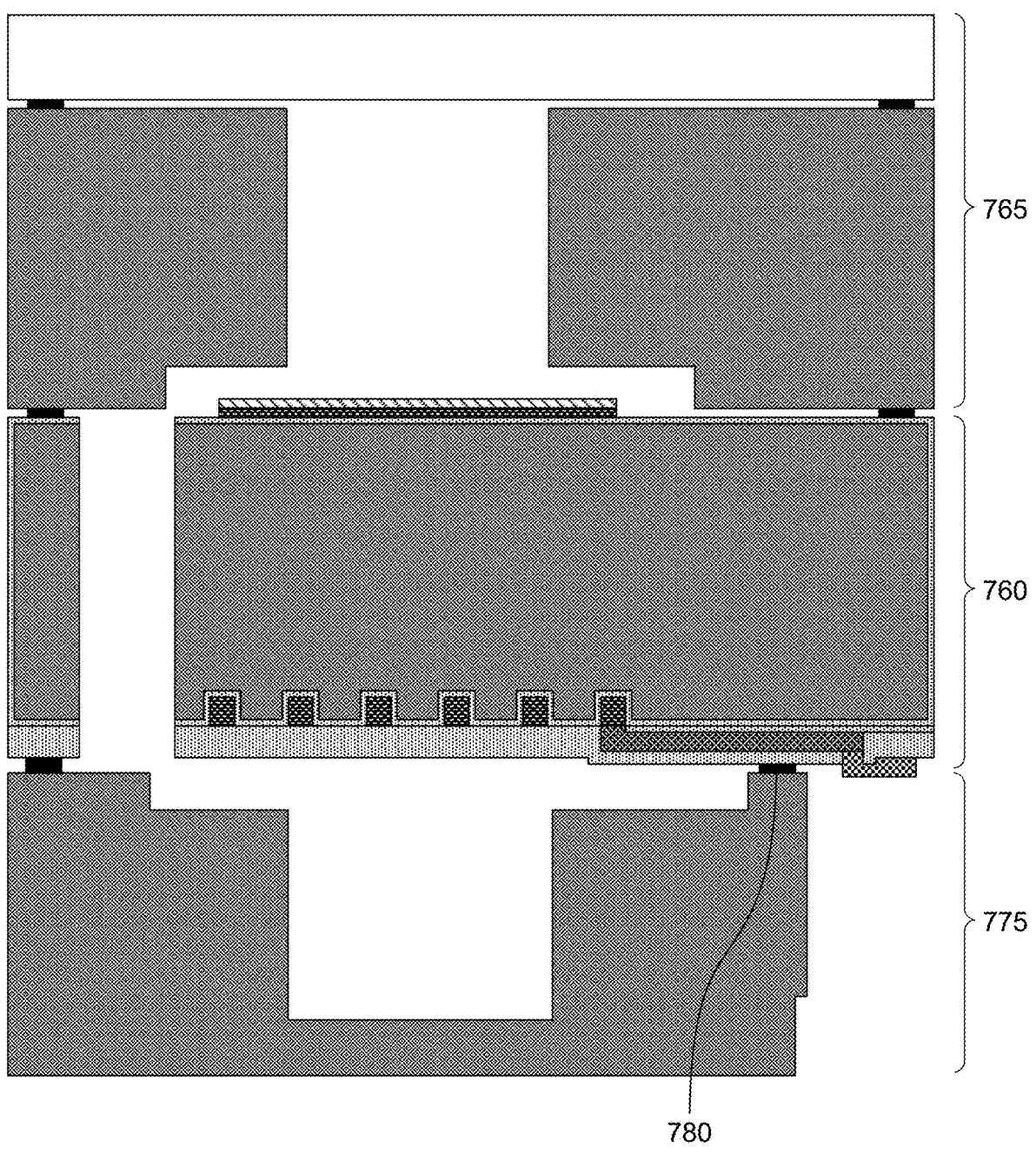

FIGS. 5A-5G provide schematic illustrations of various points in the fabrication process for making a scanning micromirror device. In this example, the fabrication process begins with a silicon-on-insulator (SOI) wafer 500 as shown in FIG. 5A. As a first step, the position of a conducting coil is established using a photolithography process, which can indicate positions of the SOI wafer 500 where the conducting coil will be embedded in a platform of the resultant scanning micromirror device. The silicon may be etched after the photolithography step to create recessed positions for the conducting coil, followed by stripping of any photoresist. The wafer may be subjected to a dry oxidation process, followed by deposition of a silicon nitride layer (SiN), such as using a low-pressure chemical vapor deposition method, to create an insulator separating the conducting coil from the silicon wafer. A metal seed layer 510 can be deposited into recesses, such as a tantalum/copper seed layer, by a sputtering process, for example. At this point, the wafer can appear similar to that shown in FIG. 5A, where the SOI wafer is identified by reference numeral 500, the recesses are identified by reference numeral 505, and the metal seed layer is identified by reference numeral 510.

Following this, a copper layer can be deposited on the metal seed layer for bulk of the conducting coil, such as using an electrochemical deposition process. A chemical-mechanical polishing or planarization process can be used to remove excess copper and metal seed layer and create a flat surface of the device, resulting in the recesses being filled with copper. At this point, the wafer can appear similar to that shown in FIG. 5B, where the copper filled recesses are identified by reference numeral 515.

A plasma-enhanced chemical vapor deposition process can be used to passivate the surface to create a silicon nitride/silicon oxide layer. A via 520, providing an access point for electrical contact to the conducting coil can be established by a photolithography process, followed by etching of the via and stripping of any remaining photoresist. At this point, the wafer can appear similar to that shown in FIG. 5C, where the via is identified by reference numeral 520.

To provide conductivity, a second metal layer 525 can be deposited, such as a titanium/molybdenum layer. The second metal layer can provide an electrical connection to the conductive coil at the via 520 established above. The second metal layer 525 can be subjected to photolithography to define where the second metal layer 525 is to be retained, followed by an etching process (e.g., a wet etching process) and a photoresist stripping process. Another passivation layer 530 (e.g., silicon oxide) can be created, such as using a plasma-enhanced chemical vapor deposition process. At this point, the wafer can appear similar to that shown in FIG. 5D, where the second metal layer is identified by reference numeral 525 and the passivation layer is identified by reference numeral 530.

A photolithography process can be used to define the position of the platform of the scanning micromirror device and the top passivation layer can be thinned or removed by an etching process and any remaining photoresist can be stripped. For the reflector of the scanning micromirror device, a reflective layer 535, such as an aluminum layer can be deposited and patterned using a series of deposition, photolithography, etching and photoresist stripping processes. A passivation layer 530 may again be created (e.g., by plasma-enhanced chemical vapor deposition). At this point, the wafer can appear similar to that shown in FIG. 5E, where the reflector is identified by reference numeral 535 and the passivation layer is identified by reference numeral 540.

A photolithography process can be used to define a second via 540 for connecting to the second metal layer, such as to allow wire bonding. The via can be etched followed by stripping any residual photoresist. Another photolithography process can be used to define regions between and surrounding the platform of the scanning micromirror device, the support flexures, and the frames (if any) positioned between the base and the platform. Recesses can be established by one or more etching processes, and a photoresist stripping process. At this point, the wafer can appear similar to that shown in FIG. 5F, where the via for the second metal layer is identified by reference numeral 545.

A protective layer, such as parylene, can be deposited over the device, followed by stripping of the protective layer from the back side, to allow for processing of the underside of the device while the top side is protected. In this example, the back side can be subjected to photolithography followed by one or more etching processes for removing silicon oxide layers, silicon nitride layers, the handle wafer and the buried oxide layers. The parylene and any residual photoresist layers can be stripped. Finally, the wafer can be diced, such as by a stealth or laser dicing process. The resultant wafer 550 can appear similar to that shown in FIG. 5G, where the scanning micromirror platform is identified by reference numeral 555.

It will be appreciated that the steps outlined in this example are merely one example of a process for making components of a scanning micromirror device and that other processes or orders of steps may be used.

Example 2: Manufacturing a Scanning Micromirror Device a Conductive Coil and a Stress-Relief Layer This example provides an overview of a fabrication scheme for making a scanning micromirror device. Various details are described in this example that will allow the skilled artisan to understand example processes used for making scanning micromirror devices useful with the image projection systems, head-mounted display systems, and two-dimensional scanning systems described herein. It will be appreciated that conventional processes may be used for some fabrication steps. Not all fabrication steps may be described in detail in this example so as not to obscure other disclosed aspects. It will be appreciated that the figures described in this example are for illustrative purposes and may not be to scale.

FIGS. 6A-6H provide schematic illustrations of various points in the fabrication process for making a scanning micromirror device. In this example, the fabrication process begins with a silicon wafer 600, polished on both sides. As a first step, the position of a conducting coil is established using a photolithography process, which can indicate positions of the wafer where the conducting coil will be embedded in a platform of the resultant scanning micromirror device. The silicon may be etched after the photolithography step to create recessed positions for the conducting coil, followed by stripping of any photoresist. The wafer may be subjected to a dry oxidation process, followed by deposition of a silicon nitride layer (SiN), such as using a low-pressure chemical vapor deposition method, to create an insulator separating the conducting coil from the silicon wafer. A metal seed layer 610 can be deposited into recesses, such as a tantalum/copper seed layer, by a sputtering process, for example. At this point, the wafer can appear similar to that shown in FIG. 6A, where the silicon wafer is identified by reference numeral 600, the recesses are identified by reference numeral 605, and the metal seed layer is identified by reference numeral 610.

Following this, a copper layer can be deposited on the metal seed layer for bulk of the conducting coil, such as using an electrochemical deposition process. A chemical-mechanical polishing or planarization process can be used to remove excess copper and metal seed layer and create a flat surface of the device, resulting in recesses 605 being filled with copper. At this point, the wafer can appear similar to that shown in FIG. 6B, where the copper filled recesses are identified by reference numeral 615.

A plasma-enhanced chemical vapor deposition process can be used to passivate the surface to create a silicon nitride/silicon oxide layer. A via, providing an access point for electrical contact to the conducting coil can be established by a photolithography process, followed by etching of the via and stripping of any remaining photoresist. At this point, the wafer can appear similar to that shown in FIG. 6C, where the via is identified by reference numeral 620.

To provide conductivity, a second metal layer 625 can be deposited, such as a titanium/molybdenum layer. The second metal layer can provide an electrical connection to the conductive coil at the via established above. The second metal layer 625 can be subjected to photolithography to define where the second metal layer 625 is to be retained, followed by an etching process (e.g., a wet etching process) and a photoresist stripping process. Another passivation layer 630 (e.g., silicon oxide) can be created, such as using a plasma-enhanced chemical vapor deposition process. At this point, the wafer can appear similar to that shown in FIG. 6D, where the second metal layer is identified by reference numeral 625 and the passivation layer is identified by reference numeral 630.

As shown in FIGS. 6A-6D, the above steps can all be used for creating a conducing coil on a back side of the silicon wafer. It will be appreciated that the reference terms back side and front side or top side and bottom side are merely examples describing relative opposite sides of a wafer and that these terms are not intended to be limiting. It will further be appreciated that the steps outlined are merely one example of a process for making components of a scanning micromirror device and that other processes or orders of steps may be used.

A stress relief layer 635, such as a copper layer, and a reflective layer 640, such as an aluminum layer, can be deposited on the front side of the wafer, such as with photolithography steps, etching steps, and photoresist stripping processes, to define the position of the stress relief layer 635, the reflective layer 640, and the platform. Passivation processes (e.g., a silicon oxide and/or silicon nitride layer deposition by plasma-enhanced chemical vapor deposition) can optionally be used to isolate the stress relief layer and the reflective layer from one another and from the silicon wafer. At this point, the wafer can appear similar to that shown in FIG. 6E, where the stress relief layer is identified by reference numeral 635 and the reflective layer is identified by reference numeral 640.

A photolithography process can be used to define a second via for connecting to the second metal layer. The via can be etched followed by stripping any residual photoresist. A third metal layer 645, such as aluminum, can be deposited into the via, with photolithography, etching, and photoresist stripping used for patterning the third metal layer. At this point, the wafer can appear similar to that shown in FIG. 6F, where the third metal layer is identified by reference numeral 645.

The overall shape of the scanning micromirror platform can be established by identifying regions of the passivation layers on the back side of the device for selective removal by photolithographically patterning the back side and etching the passivation layers, followed by stripping any excess photoresist. In this case, the passivation layers on the back side can be considerably thick, so it can be difficult to remove them by etching from the front side, so they are selectively removed at this stage, where desired, from the back side. A protective layer, such as parylene, can be deposited over the device, followed by stripping of the protective layer from the front side in preparation for through-etching the silicon wafer. At this point, the wafer can appear similar to that shown in FIG. 6G, where the parylene protective layer is identified by reference numeral 650.

Finally, the overall shape of the scanning micromirror platform can be established from the front side of the device, by lithographically patterning and etching the passivation layers, followed etching the silicon through to the parylene layer, which is subsequently stripped. Finally, the wafer can be diced, such as by a stealth or laser dicing process, if desired. The resultant wafer 660 can have features similar to that shown in FIG. 6H. In some cases, the wafer can be diced later, such as after assembly of vacuum packaging, as described below in Example 3.

Example 3: Hermetic or Vacuum Packaging for a Scanning Micromirror Device

This example provides an overview of making a vacuum packaging for a scanning micromirror device. Various details are described in this example that will allow the skilled artisan to understand example processes used for making scanning micromirror devices useful with the image projection systems, head mounted display systems, and two-dimensional scanning systems described herein. It will be appreciated that conventional processes may be used for some fabrication steps. Not all fabrication steps may be described in detail in this example so as not to obscure other disclosed aspects. It will be appreciated that the figures described in this example are for illustrative purposes and may not be to scale.

FIGS. 7A-7G provide schematic illustrations of various points in the fabrication/assembly process for vacuum packaging of a scanning micromirror device. In this example, the fabrication of the top packaging begins with a silicon wafer, polished on both sides. As a first step, the wafer can be drilled and/or machined to create holes and recesses needed to accommodate the scanning micromirror device and motion of the scanning micromirror device. A cleaning process can be used to prepare for the next part of the process. At this point, the top packaging wafer can appear similar to that shown in FIG. 7A, where the silicon wafer is identified by reference numeral 700, a through hole is identified by reference numeral 705, and a recess is identified by reference numeral 710.

Glass frit paste can be screen printed over the top of the silicon wafer to bond and seal a transparent cap, such as a glass (e.g., borosilicate glass) or crystalline cap. At this point, the top packaging can appear similar to that shown in FIG. 7B, with the transparent cap is identified by reference numeral 715 and the glass frit paste is identified by reference numeral 720. The transparent cap can be coated on one or both sides with an antireflection coating.

The fabrication of the bottom packaging can start similarly, with a silicon wafer 725, polished on both sides. A top side recess 730 can be photolithographically patterned and etched, followed by stripping any excess photoresist. A location for a hole on the bottom side can also be patterned via photolithography. At this point, the bottom packaging wafer can appear similar to that shown in FIG. 7C, where the silicon wafer is identified by reference numeral 725, the top side recess identified by reference numeral 730, and the patterned photoresist on the back side identified by reference numeral 735.

The bottom side can be partially etched to create a recess for the hole to be fully etched later, followed by stripping any excess photoresist. The device can be protected, such as by a parylene protective layer 745, which can be removed from the front side for further processing. At this point, the bottom packaging wafer can appear similar to that shown in FIG. 7D, where the partial etch is identified by reference numeral 740 and the protective layer is identified by reference numeral 745.

The top side can be lithographically patterned to define a deeper recess 750 and the location for the hole 755 partially etched from the bottom side in the previous step. The wafer can be then etched to create the second recess 750 and complete the hole 755, followed by stripping any excess photoresist and protective layer material. The second recess 750 can be useful for accommodating motion of the platform of the scanning micromirror device, for example. At this point, the bottom packaging wafer can appear similar to that shown in FIG. 7E, where the deeper recess is identified by reference numeral 750 and the hole identified by reference numeral 755.

The top and bottom packaging can be assembled to a scanning micromirror device, prepared, for example, according to Example 2 above. For the top side, glass frit paste 770 can be screen printed onto the bottom side of the top packaging for 765 bonding to the top side of the scanning micromirror device 760. At this point, the assembly can appear similar to that shown in FIG. 7F, where the scanning micromirror device is identified by reference numeral 760, the top packaging is identified by reference numeral 765, and the glass frit paste is identified by reference numeral 770.

For the bottom side, glass frit paste 780 can be screen printed onto the top side of the bottom packaging 775 for bonding to the bottom side of the scanning micromirror device 760. The assembled vacuum packaged scanning micromirror device can appear similar to that shown in FIG. 7G, where the scanning micromirror device is identified by reference numeral 760, the top packaging is identified by reference numeral 765, the bottom packaging is identified by reference numeral 775 and the glass frit paste is identified by reference numeral 780. As illustrated, the hole in the bottom packaging is positioned to align with the third metal layer on the bottom side of the scanning micromirror device.

Although the above description of making a vacuum packaging references the scanning micromirror device prepared according to Example 2 above, other scanning micromirror devices can benefit from and be positioned in a vacuum packaging according to this Example. For example, U.S. Provisional Patent Application No. 63/034,884, filed on Jun. 4, 2020 and hereby incorporated by reference describes a two-dimensional micro-electromechanical system mirror having electromagnetic actuation, and these micromirror devices can be similarly packaged using the vacuum packaging components and techniques described above. Such a system may utilize a single micromirror device for two-dimensional scanning, in contrast with the other systems described herein which employ a first scanning mirror device for oscillations along a first direction and a second scanning mirror device for oscillations along a second direction perpendicular to the first direction. In one specific example, scanning micromirror device 760 can comprise a two-dimensional micro-electromechanical system mirror including a base, a first platform coupled to the base by a plurality of first support flexures, and a second platform coupled to the first platform by a plurality of second support flexures, the second platform including a reflector. The first platform may be oscillatable about a first axis, which can be useful for controlling oscillations of reflected light in a first direction. The second platform may be oscillatable about a second axis orthogonal to the first axis, which can be useful for controlling oscillations of reflected light in a second direction, which can be orthogonal (e.g., perpendicular) to the first direction. The first platform, the second platform, and the plurality of second support flexures together may exhibit a first resonance having a first resonant frequency, with the first resonance corresponding to oscillatory motion of at least the first platform, the second platform, and the plurality of second support flexures about the first axis. The first platform, the second platform, and the plurality of second support flexures together may exhibit or further exhibit a second resonance having a second resonant frequency, with the second frequency being greater than the first frequency, and the second resonance corresponding to oscillatory motion of at least the second platform about the second axis. The first platform, the second platform, and the plurality of second support flexures together may exhibit or further exhibit a third resonance having a third resonant frequency, with the third frequency being double the second frequency, and the third resonance corresponding to oscillatory motion of at least the second platform about the first axis.

Computing Device Components

A computing device may be incorporated as part of the previously described systems, such as image projection systems, head-mounted display systems, and two-dimensional scanning systems. Computing devices may be useful for performing aspects of the previously described methods and systems. For example, computing devices may be useful for controlling modulation of a light beam. Computing devices may also be useful for controlling orientation and/or oscillation of a scanning mirror. Computing devices may also be useful for controlling application of a voltage or current. An example computing device comprises hardware elements that may be electrically coupled via a bus (or may otherwise be in communication). The hardware elements may include one or more processors, including without limitation one or more general-purpose processors and/or one or more special-purpose processors (such as digital signal processing chips, graphics acceleration processors, video decoders, and/or the like); one or more input devices, which may include without limitation a mouse, a touch-screen, keyboard, remote control, voice input, and/or the like; and one or more output devices, which may include without limitation a display device, a printer, speaker, a servo, a linear actuator, a rotational actuator, etc.

The computing device may further include (and/or be in communication with) one or more non-transitory storage devices, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device may also include a communications subsystem, which may include without limitation a modem, a network card (wireless or wired), an infrared communication device, a wireless communication device, and/or a chipset (such as a Bluetooth device, a Bluetooth Low Energy or BLE device, an 802.11 device, an 802.15.4 device, a WiFi device, a WiMax device, cellular communication device, etc.), a G.hn device, and/or the like. The communications subsystem may permit data to be exchanged with a network, other computer systems, and/or any other devices described herein. In many embodiments, the computing device will further comprise a working memory, which may include a RAM or ROM device, as described above.

The computing device also may comprise software elements, shown as being currently located within the working memory, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods discussed above may be implemented as code and/or instructions executable by a computer (and/or a processor within a computer); in an aspect, then, such code and/or instructions may be used to configure and/or adapt a computer (or other device) to perform one or more operations in accordance with the described methods or for operation of the described devices and systems.

A set of these instructions and/or code may be stored on a non-transitory computer-readable storage medium, such as the non-transitory storage devices described above. In some cases, the storage medium may be incorporated within a computer system, such as the computing device described above. In other embodiments, the storage medium may be separate from a computer system (e.g., a removable medium, such as a compact disc, or a cloud- or network-based storage system), and/or provided in an installation package, such that the storage medium may be used to program, configure, and/or adapt a computer with the instructions/code stored thereon. These instructions may take the form of executable code, which is executable by the computing device or a component thereof and/or may take the form of source and/or installable code, which, upon compilation and/or installation on the computing device (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware may also be used, and/or particular elements may be implemented in hardware, software (including portable software, such as applets, etc.), or both. Further, connection to other computing devices such as network input/output devices may be employed.

As mentioned above, in one aspect, some embodiments may employ a computing device to perform methods in accordance with various embodiments. According to a set of embodiments, some or all of the procedures of such methods are performed by the computing device in response to a processor executing one or more sequences of one or more instructions (which may be incorporated into the operating system and/or other code, such as an application program) contained in the working memory. Such instructions may be read into the working memory from another computer-readable medium, such as one or more non-transitory storage devices. Merely by way of example, execution of the sequences of instructions contained in the working memory may cause the processor to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device, various computer-readable media may be involved in providing instructions/code to a processor for execution and/or may be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as a non-transitory storage device. Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computing device.

The communications subsystem (and/or components thereof) generally will receive signals, and the bus then may carry the signals (and/or the data, instructions, etc. carried by the signals) to the working memory, from which the processor retrieves and executes the instructions. The instructions received by the working memory may optionally be stored on a non-transitory storage device either before or after execution by the processor.

It should further be understood that the components of computing device may be distributed. For example, some processing may be performed in one location using a first processor while other processing may be performed by another processor remote from the first processor. Optionally, systems described herein may include multiple independent processors that may exchange instructions or issue commands or provide data to one another. Other components of computing device may be similarly distributed. As such, a computing device may be interpreted as a distributed computing system that performs processing in multiple locations. In some instances, a computing device may be interpreted as a single computing device, such as a distinct laptop, desktop computer, or the like, depending on the context.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A scanning micromirror system comprising:
a base having an axis passing therethrough;
a plurality of support flexures coupled to the base;
a platform coupled to the base by the plurality of support flexures, wherein the platform has a first side and a second side opposing the first side and is operable to oscillate about the axis;
a stress relief layer positioned on the first side of the platform, wherein the stress relief layer provides a first stress distribution on the first side of the platform;
a conducting coil positioned on the second side of the platform, wherein the conducting coil provides a second stress distribution on the second side of the platform, and wherein the first stress distribution and the second stress distribution are opposite; and
a reflector positioned on the first side of the platform, wherein the stress relief layer is positioned between the reflector and the platform.

2. The scanning micromirror system of claim 1, wherein the stress relief layer comprises the same material as the conducting coil.

3. The scanning micromirror system of claim 1, wherein the stress relief layer has a first volume and the conducting coil has a second volume, wherein the first volume is equal to the second volume.

4. The scanning micromirror system of claim 1, wherein the conducting coil is arranged to apply magnetic forces to the platform about the axis.

5. The scanning micromirror system of claim 1, wherein the conducting coil is embedded into the second side of the platform.

6. The scanning micromirror system of claim 1, wherein the conducting coil comprises a first metal and a second metal.

7. The scanning micromirror system of claim 1, further comprising a plurality of conductive traces on the plurality of support flexures for providing electrical communication with the conducting coil, and wherein the plurality of conductive traces are arranged on the plurality of support flexures in a configuration to apply opposite stresses on different sides of the plurality of support flexures.

8. The scanning micromirror system of claim 1, further comprising a first magnetic field source arranged to apply a first magnetic field to the platform, wherein the first magnetic field source is arranged to provide the first magnetic field oriented orthogonal to the axis.

9. The scanning micromirror system of claim 1, further comprising one or more piezoelectric actuators arranged to apply forces to oscillate the platform about the axis or to sense oscillation or position of the platform about the axis.

10. The scanning micromirror system of claim 1, further comprising a hermetic packaging enclosing the scanning micromirror system for maintaining a lower pressure at the scanning micromirror system inside the hermetic packaging than outside the hermetic packaging.

11. The scanning micromirror system of claim 1, further comprising a passivation layer.

12. The scanning micromirror system of claim 1, further comprising a second scanning micromirror system in optical communication with the scanning micromirror system, wherein the second scanning micromirror system comprises:

a second base having a second axis passing therethrough;

a plurality of second support flexures coupled to the second base;

a first frame coupled to the second base by the plurality of second support flexures, wherein the first frame is operable to oscillate about the second axis;

a second platform coupled to the first frame, wherein the second platform has a first side and a second side opposing the first side, wherein the second platform is operable to oscillate about the second axis together with the first frame; and a second reflector positioned on the second platform.

13. The scanning micromirror system of claim 12, wherein the second scanning micromirror system further comprises a strain sensor incorporated in the first frame.

14. The scanning micromirror system of claim 12, wherein the scanning micromirror system has a first natural resonant frequency of 1 kHz to 10 MHz and wherein the second scanning micromirror system has a second natural resonant frequency of 15 Hz to about 2 kHz.

15. The scanning micromirror system of claim 12, wherein the second scanning micromirror system further comprises a second frame coupled between the first frame and the second platform, wherein the second frame is coupled to the first frame by a plurality of third support flexures and wherein the second frame is operable to oscillate about the second axis together with the first frame and the second platform.

16. The scanning micromirror system of claim 15, wherein the second scanning micromirror system further comprises a plurality of piezoelectric actuators incorporated in the second frame, wherein the plurality of piezoelectric actuators are arranged to alter a position of the second platform about a third axis orthogonal to the second axis or to alter a curvature of the second platform.

17. A method of projecting an image, the method comprising:

providing a scanning micromirror system, wherein the scanning micromirror system comprising:

a base having an axis passing therethrough;

a plurality of support flexures coupled to the base;

a platform coupled to the base by the plurality of support flexures, wherein the platform has a first side and a second side opposing the first side and is operable to oscillate about the axis;

a stress relief layer positioned on the first side of the platform, wherein the stress relief layer provides a first stress distribution on the first side of the platform; and a reflector positioned on the first side of the platform, wherein the stress relief layer is positioned between the reflector and the platform;

a conducting coil positioned on the second side of the platform, wherein the conducting coil is arranged to apply magnetic forces to the platform about the axis, wherein the conducting coil provides a second stress distribution on the second side of the platform, and wherein the first stress distribution and the second stress distribution are opposite; and a magnetic field source arranged to apply a magnetic field to the platform;

inducing an oscillation of the scanning micromirror system at a frequency; and illuminating the reflector with a light source to generate output reflected light.

18. The method of claim 17, further comprising directing the output reflected light from the scanning micromirror system to an eyepiece.

19. The method of claim 17, further comprising controlling oscillation of the scanning micromirror system and output color and/or intensity of light from the light source.

* * * * *